(12) United States Patent
Lipson et al.

(10) Patent No.: US 6,463,426 B1
(45) Date of Patent: Oct. 8, 2002

(54) INFORMATION SEARCH AND RETRIEVAL SYSTEM

(75) Inventors: Pamela R. Lipson, Cambridge, MA (US); Pawan Sinha, Madison, WI (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/179,541

(22) Filed: Oct. 26, 1998

Related U.S. Application Data

(60) Provisional application No. 60/063,623, filed on Oct. 27, 1997.

(51) Int. Cl.[7] .............................................. G06F 17/00
(52) U.S. Cl. .................. 707/3; 707/4; 707/6; 382/181; 345/145
(58) Field of Search .............. 707/1–206; 345/433–443, 345/144–151; 382/154–285

(56) References Cited

U.S. PATENT DOCUMENTS 5,652,881 A   7/1997   Takahashi ...................... 707/5

OTHER PUBLICATIONS

Ma et al., "Content–based Image indexing and retrieval," Furht's Handbook of multimedia computing, pp. 227–230, 244–245, Dec. 1999.*

"A Modular Approach to Auotmatic Printed Circuit Board Inspection," Moganti, M.; Ercal, F.; Yellepeddy, V.; *Machine Vision Applications in Industrial Inspection IV*, Jan. 31, 1996–Feb. 1, 1996, pp 197–208.

"An Intelligent Vision System For Inspection of Packaged ICS," Mital, D.P. et al.; *Energy, Electroni Computers, Communications, Bombay*, Nov. 22–24, 1989, pp 1003–1009.

"Photobook:Content Based Manipulation of Image Databases," Pentland. A. et al.; *International Journal of Computer Vision*, vol. 18, No. 3, Jun. 1, 1996, pp 233–254.

* cited by examiner

*Primary Examiner*—David Jung
(74) *Attorney, Agent, or Firm*—Daly, Crowley & Mofford, LLP

(57) ABSTRACT

An image search and retrieval system and method of operation within such a system are disclosed. The image search and retrieval system includes a search engine coupled to an image analyzer, an input system, an output system and an image database. The image search and retrieval system includes one or more feature modules which define particular regions of an image and particular measurements to make on pixels within the defined image region as well as the measurements to make on neighboring pixels in neighboring image regions for a given application and communicate this application specific information to the image analyzer thereby allowing rapid comparisons of images.

26 Claims, 30 Drawing Sheets

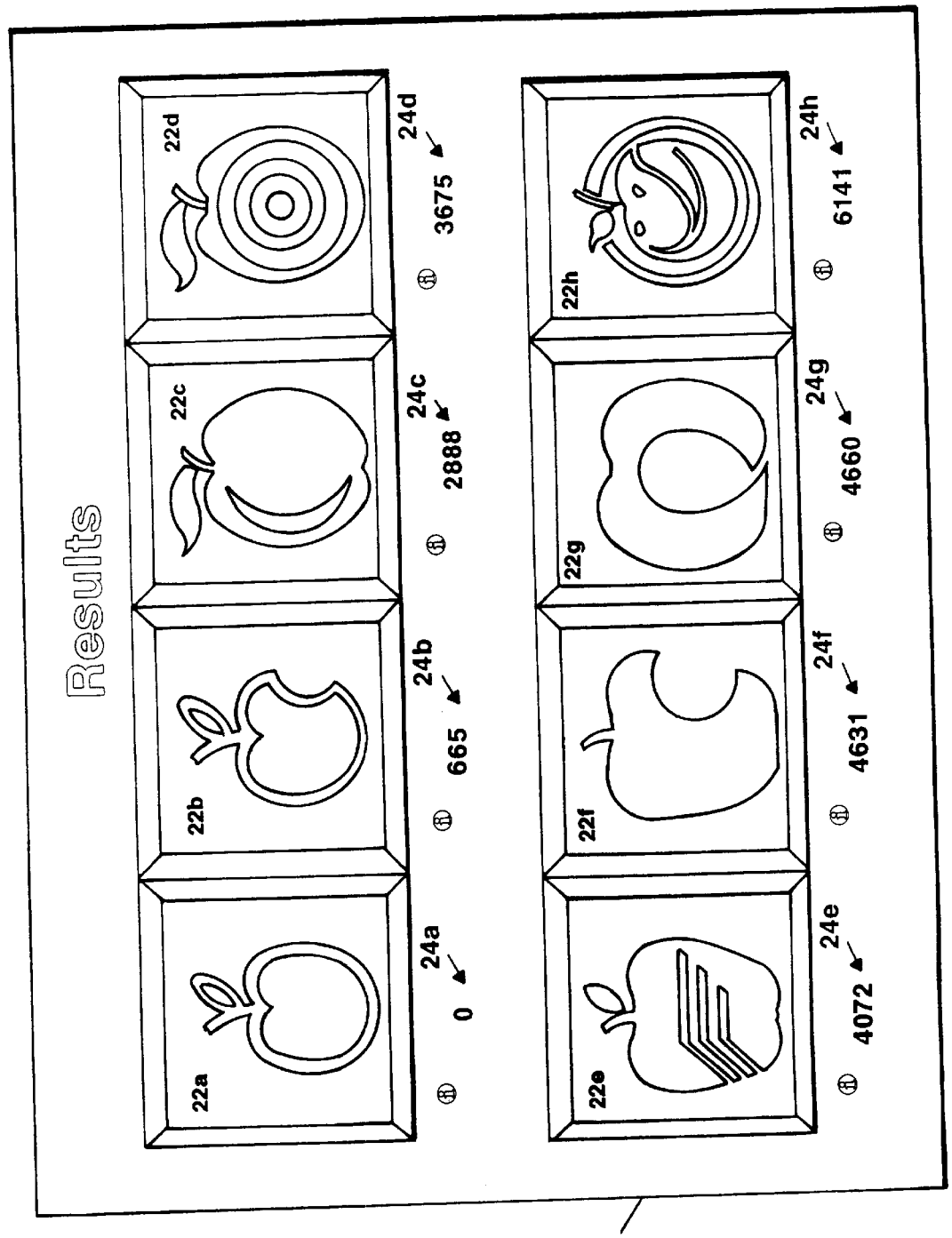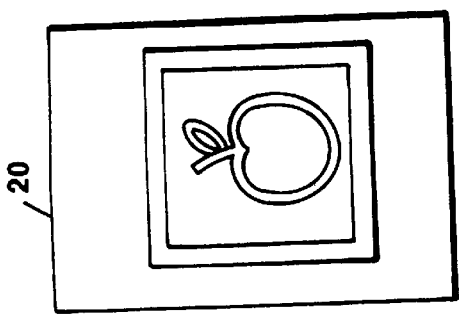
Figure 1A

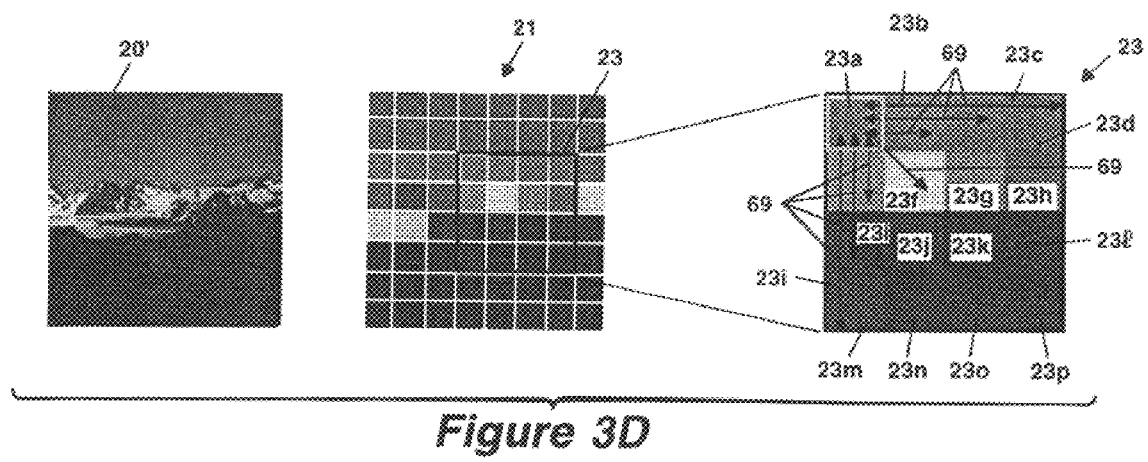
*Figure 3D*
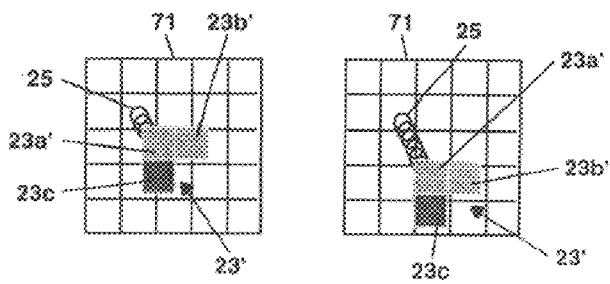
*Figure 3E*   *Figure 3F*

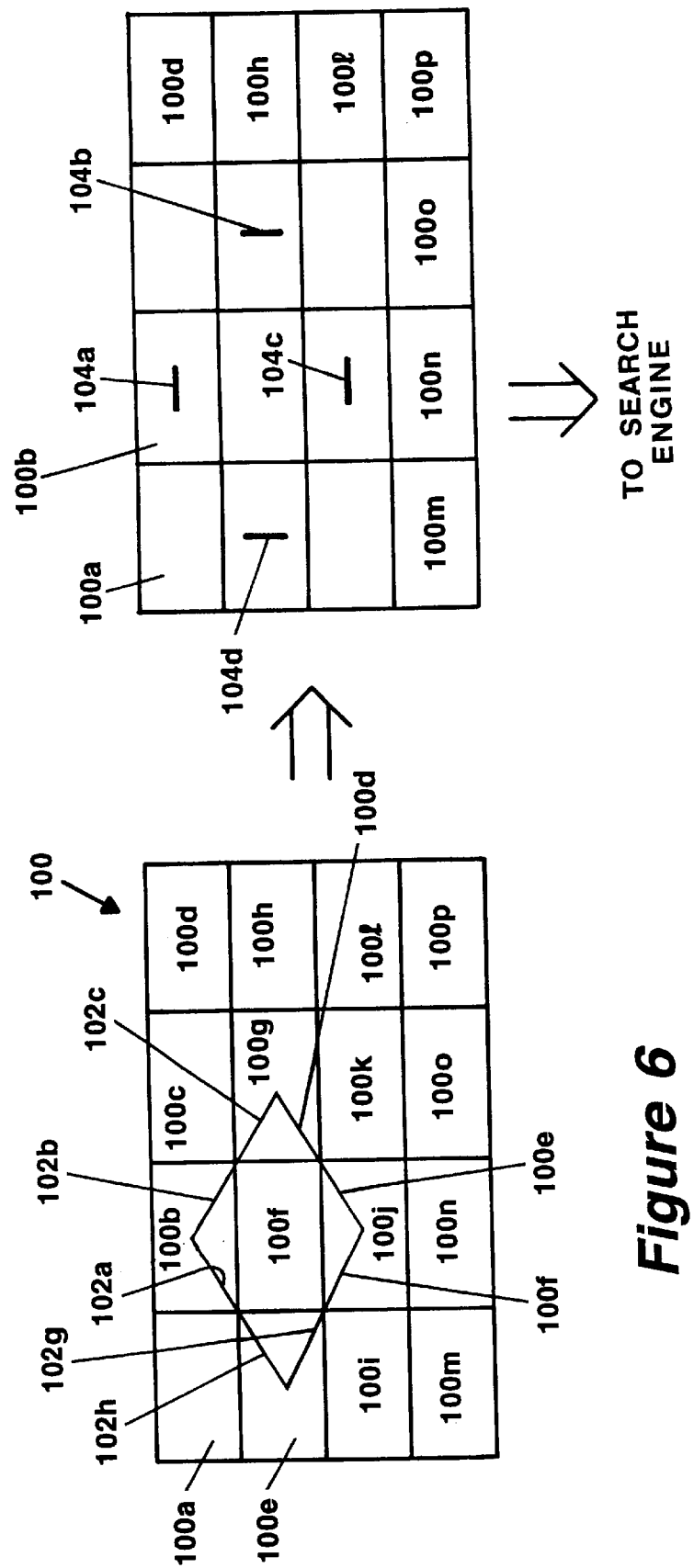

190

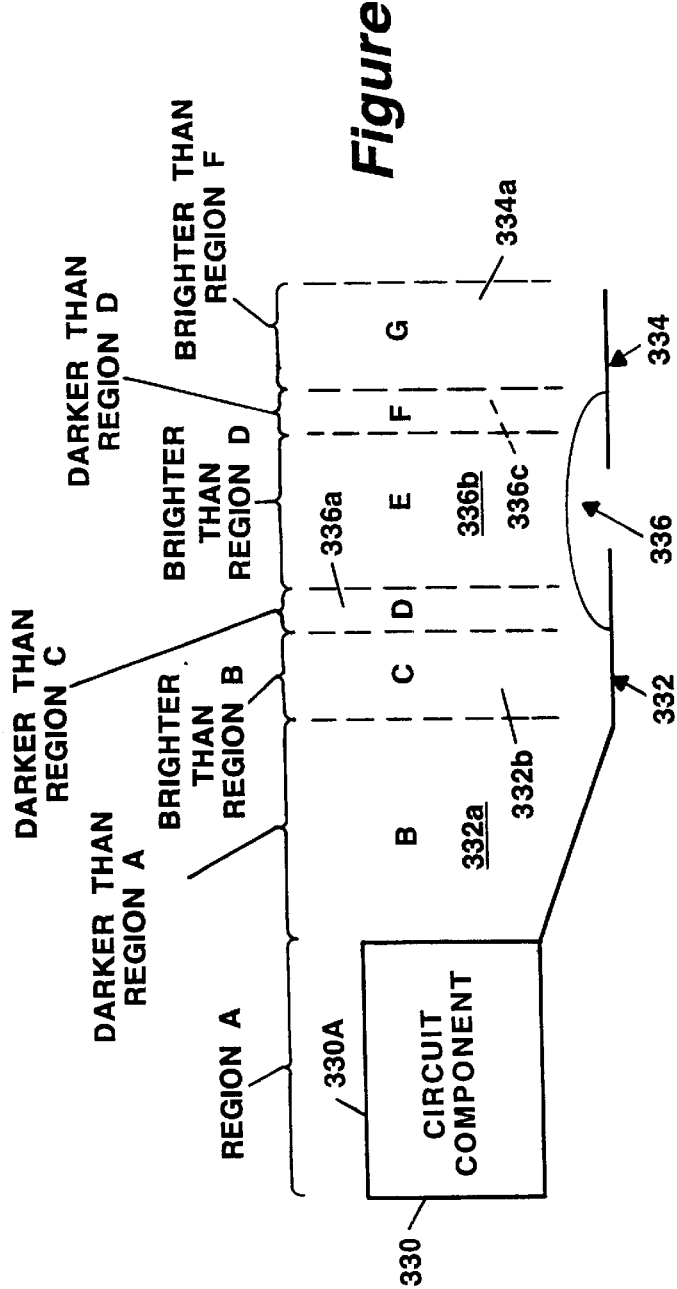

INFORMATION SEARCH AND RETRIEVAL SYSTEM

CROSS-REFERENCE TO RELATED APPLICATIONS

This application claims priority under 35 U.S.C. §119(e) from application No. 60/063,623 filed Oct. 27, 1997.

STATEMENTS REGARDING FEDERALLY SPONSORED RESEARCH

This invention was made with government support under Grant No. N00014-95-1-0600 awarded by the U.S. Navy. The government has certain right in the invention.

BACKGROUND OF THE INVENTION

This invention relates to information search and retrieval systems and more particularly to search and retrieval systems which utilize in whole or in part image processing techniques.

As is known in the art, a digital image is an image which may be represented as an array of pixels with each of the pixels represented by a digital word. Often the array is provided as a two-dimensional array of pixels. With the increase in the number of available digital pictures, the need has arisen for more complete and efficient annotation (attaching identifying labels to images) and indexing (accessing specific images from the database) systems. Digital image/video database annotation and indexing services provide users, such as advertisers, news agencies and magazine publishers with the ability to browse through, via queries to an image search system, and retrieve images or video segments from such databases.

As is also known, a content based image retrieval system is an image retrieval system which classifies, detects and retrieves images from digital libraries by utilizing directly the content of the image. Content based image processing systems refer to systems which process information in an image by classifying or otherwise identifying subject matter within the image. Such systems may be used in a variety of applications including, but not limited to, art gallery and museum management, architectural image and design, interior design, remote sensing and management of earth resources, geographic information systems, scientific database management, weather forecasting, retailing, fabric and fashion design, trademark and copyright database management, law enforcement and criminal investigation and picture archiving, communication systems and inspection systems including circuit inspection systems.

Conventional content based image/video retrieval systems utilize images or video frames which have been supplemented with text corresponding to explanatory notes or key words associated with the images. A user retrieves desired images from an image database, for example, by submitting textual queries to the system using one or a combination of these key words. One problem with such systems is that they rely on restricted predefined textual annotations rather than on the content of the still or video images in the database.

Still other systems attempt to retrieve images based on a specified shape. For example, to find images of a fish, such systems would be provided with a specification of a shape of a fish. This specification would then be used to find images of a fish in the database. One problem with this approach, however, is that fish do not have a standard shape and thus the shape specification is limited to classifying or identifying fish having the same or a very similar shape.

Still other systems classify images or video frames by using image statistics including color and texture. The difficulty with these systems is that for a given query image, even though the images located by the system may have the same color, textural, or other statistical properties as the example image, the images may not be part of the same class as the query image. That is, if the query image belongs to the class of images identified as human faces, then systems which classify images or video frames based image statistics including color and texture may return images which fall within the desired color and texture image statistics but which are not human faces.

It would thus be desirable to provide a system and technique which may be used in a general image search and retrieval system and which allows searching of a plurality of different types of images including but not limited to human or animal faces, fabric patterns, symbols, logos, art gallery and museum management, architectural image and design, interior design, remote sensing and management of earth resources, geographic information systems, scientific database management, weather forecasting, retailing, fabric and fashion design, trademark and copyright database management, law enforcement and criminal investigation, picture archiving, communication systems and inspection systems including circuit inspection systems. It would be particularly desirable to have the system be capable of automatically learning which factors are most important in searching for a particular image or for a particular type of image.

SUMMARY OF THE INVENTION

In accordance with the present invention, image processing system includes a search engine coupled to an image analyzer. The image analyzer and search engine are coupled to one or more feature modules which provide the information necessary to describe how to optimize the image analyzer for a particular application. With this particular arrangement, an image processing system which can rapidly match a primary image to a target iomage is provided. Each feature module defines particular regions of an image and particular measurements to make on pixels within the defined image region as well as the measurements to make on neighboring pixels in neighboring image regions for a given application. The feature modules thus specify parameters and characteristics which are important in a particular image match/search routine. The plug-in-modules communicate this application specific information to image analyzer. The information specified by a particular feature module will vary greatly depending upon the particular application. By using the feature modules, generic search engines and image analyzers can be used. Thus the system can be rapidly adapted to operate in applications as widely varying as inspection of printed circuit boards or integrated circuits to searching for trademark images. In each application, the particular parameters and characteristics which are important are provided by the feature module.

It should thus be noted that the techniques of the present invention have applicability to a wide variety of different types of image processing applications. For example, the techniques may be used in biometric applications and systems to identify and or verify the identity of a particular person or thing, inspection systems including inspection and test of printed circuit boards (including without limitation any type of circuit board or module or integrated circuit) in all stages of manufacture from raw boards to boards which are fully assembled and/or fully loaded with components and sub-assemblies (including hybrids), including solder joint inspection, post paste inspection and post placement inspection, inspection and test of semiconductor chips in all stages of manufacture, from wafers to finished chips, image or video classification systems used to search image or video archives for a particular type of image or a particular type of video clip, and medical image processing applications to identify particular characteristics in an image, such as a tumor. Thus the phrase "image processing application" or more simply "application" as used hereinbelow refers to a wide variety of uses.

In accordance with a further aspect of the present invention, a process for comparing two images includes the steps of (a) aligning a target image and a selected image, (b) dividing the selected image into a plurality of image regions, (c) collapsing properties in predetermined image regions, (d) selecting a primary image region, (e) selecting a target image region, and (f) comparing one or more properties of the selected primary image region to corresponding one or more properties in the target image region. With this particular arrangement, a technique for comparing rapidly two image is provided. By selecting predetermined features and image regions to compare between the two images, the amount of time require to process the images is reduced. By combining or collapsing features in a selected regions of an image for compact representation, a comparison of a relatively large amount of information can be accomplished rapidly.

In accordance with a still further aspect of the present invention, a method of manufacturing a printed circuit board includes the steps of (a) performing a manufacturing operation on a printed circuit board; and (b) inspecting the result of the manufacturing operation by comparing an image of the actual operation being performed to a target image of the manufacturing operation. With this particular arrangement, the efficiency of manufacturing a printed circuit board is increases while reducing the cost of manufacturing the printed circuit board. The manufacturing can correspond to any one or more steps in the printed circuit board (PCB) manufacturing process. For example, when the manufacturing process corresponds to a solder manufacturing process, then the inspection technique may be used before and/or after the post-paste, post-placement and post-reflow operations. For example, the manufacturing process can include the inspection before and or after solder application, component placement, solder reflow, solder joint inspection or any other manufacturing step. By inspecting after predetermined steps in the manufacturing process, it is possible to detect early defects in the manufacturing process which can be corrected prior to continuing the manufacturing process. By detecting defects early in the manufacturing process, the expense and time associated with manufacturing a PCB which cannot pass a final inspection test is provided.

In one embodiment, a camera captures an image of a printed circuit board and compares that image to a target image. The target image corresponds to an image of a PCB which has been properly manufactured in during that particular portion of the manufacturing process. For example, if the manufacturing step of interest is a solder paste application step, then the captured corresponds to an image of a printed circuit board (or portion thereof) to which solder paste has been applied. The target image corresponds to an image of a PCB (or portion thereof) having solder paste properly applied thereto. Predetermined features of the two images are compared and based on the results of the comparison, decision is rendered as to whether the solder-paste was properly applied to PCB currently undergoing the manufacturing process.

BRIEF DESCRIPTION OF THE DRAWINGS

The foregoing features of this invention, as well as the invention itself, may be more fully understood from the following detailed description of the drawings in which:

FIG. 1A is a diagram of a query image and a plurality of images resultant from submitting the query image to the image search and retrieval system of FIG. 1;

FIGS. 6 and 6A are a series of images showing the steps involved in collapsing regions of an input image to generate a collapsed image to be provided to an image search engine;

FIG. 13 is a diagrammatical side view of a circuit component and a circuit lead connected to a circuit line;

DETAILED DESCRIPTION OF THE INVENTION

Figure 1:
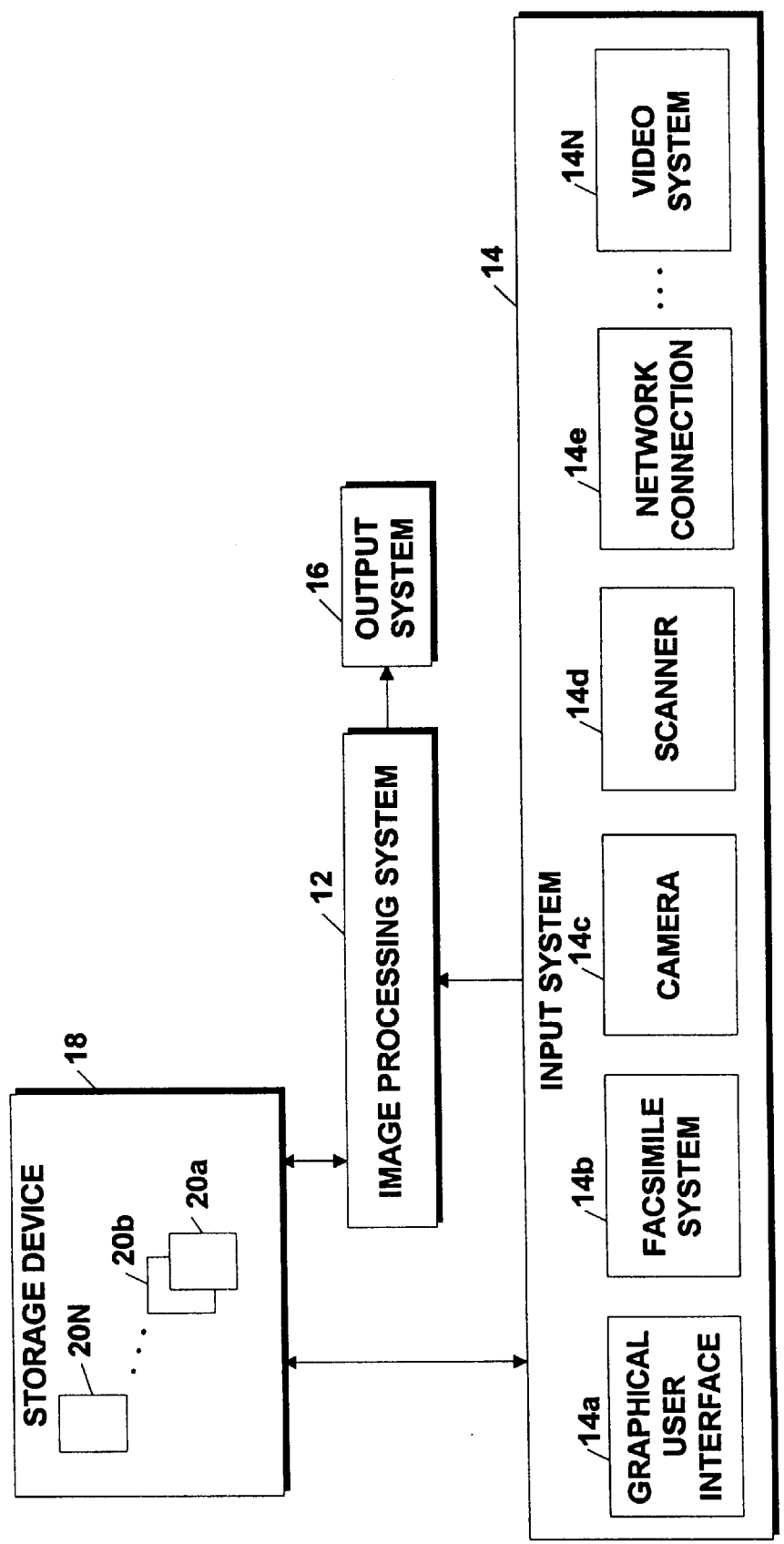
FIG. 1 is a block diagram of an image search and retrieval system.

Before describing an image search and retrieval system and the techniques associate therewith, some introductory concepts and terminology are explained.

An analog or continuous parameter image such as a still photograph may be represented as a matrix of digital values and stored in a storage device of a computer or other digital processing device. Thus, as described herein, the matrix of digital data values are generally referred to as a "digital image" or more simply an "image" and may be stored in a digital data storage device, such as a memory for example, as an array of numbers representing the spatial distribution of energy at different wavelengths in a scene.

Similarly, an image sequence such as a view of a moving roller-coaster for example, may be converted to a digital video signal as is generally known. The digital video signal is provided from a sequence of discrete digital images or frames. Each frame may be represented as a matrix of digital data values which may be stored in a storage device of a computer or other digital processing device. Thus in the case of video signals, as described herein, a matrix of digital data values are generally referred to as an "image frame" or more simply an "image" or a "frame." Each of the images in the digital video signal may be stored in a digital data storage device, such as a memory for example, as an array of numbers representing the spatial distribution of energy at different wavelengths in a scene in a manner similar to the manner in which an image of a still photograph is stored.

Whether provided from a still photograph or a video sequence, each of the numbers in the array correspond to a digital word (e.g. an eight-bit binary value) typically referred to as a "picture element" or a "pixel" or as "image data." The image may be divided into a two dimensional array of pixels with each of the pixels represented by a digital word.

Reference is sometimes made herein to color images with only a luminance component. Such images are known as gray scale images. Thus, a pixel represents a single sample which is located at specific spatial coordinates in the image. It should be noted that the techniques described herein may be applied equally well to either grey scale images or color images.

In the case of a gray scale image, the value of each digital word corresponds to the intensity of the pixel and thus the image at that particular pixel location.

In the case of a color image, reference is sometimes made herein to each pixel being represented by a predetermined number of bits (e.g. eight bits) which represent the color red (R bits), a predetermined number of bits (e.g. eight bits) which represent the color green (G bits) and a predetermined number of bits (e.g. eight bits) which represent the color blue (B-bits) using the so-called RGB color scheme in which a color and luminance value for each pixel can be computed from the RGB values. Thus, in an eight bit color RGB representation, a pixel may be represented by a twenty-four bit digital word.

It is of course possible to use greater or fewer than eight bits for each of the RGB values. It is also possible to represent color pixels using other color schemes such as a hue, saturation, brightness (HSB) scheme or a cyan, magenta, yellow, black (CMYK) scheme. It should thus be noted that the techniques described herein are applicable to a plurality of color schemes including but not limited to the above mentioned RGB, HSB, CMYK schemes as well as the Luminosity and color axes a & b (Lab) YUV color difference color coordinate system, the Karhunen-Loeve color coordinate system, the retinal cone color coordinate system and the X, Y, Z scheme.

Reference is also sometimes made herein to an image as a two-dimensional pixel array. An example of an array size is size 512×512. One of ordinary skill in the art will of course recognize that the techniques described herein are applicable to various sizes and shapes of pixel arrays including irregularly shaped pixel arrays.

A "scene" is an image or a single representative frame of video in which the contents and the associated relationships within the image can be assigned a semantic meaning. A still image may be represented, for example, as a pixel array having 512 rows and 512 columns. An "object" is an identifiable entity in a scene in a still image or a moving or non-moving entity in a video image. For example, a scene may correspond to an entire image while a boat might correspond to an object in the scene. Thus, a scene typically includes many objects and image regions while an object corresponds to a single entity within a scene.

An "image region" or more simply a "region" is a portion of an image. For example, if an image is provided as a 32×32 pixel array, a region may correspond to a 4×4 portion of the 32×32 pixel array.

Before describing the processing to be performed on images, it should be appreciated that, in an effort to promote clarity, reference is sometimes made herein to one or more "features" or "information" in "blocks" or "regions" of an image. It should be understood that the features can correspond to any or any particular characteristic of the block including its relationship to other blocks within the same or a different image. Also, such image blocks or regions should be understood as not being limited to any particular type, size or shape of a portion of an image (i.e. the block need not have a square or a rectangular shape). It should also be understood that the image need not be any particular type of image.

Similarly, reference is also sometimes made herein to comparison of the "features" or "information" in one of more blocks to "features" or "information" in one or more other blocks. The other blocks may be from the same or a different image than the first blocks. Also the processing of the blocks need not be for any specific type of image processing application. Rather the processing of the blocks applies in a wide variety of image processing applications.

Accordingly, those of ordinary skill in the art will appreciate that the description and processing taking place on "blocks" and "regions" could equally be taking place on portions of an image having a square, rectangular, triangular, circular, or elliptical shape of any size. Likewise, the particular field in which the image processing systems and techniques of the present invention may be used includes but is not limited to, biometric applications and systems to identify and or verify the identity of a particular person or thing, inspection systems including inspection and test of printed circuit boards (including without limitation any type of circuit board or module or integrated circuit) in all stages of manufacture from raw boards to boards which are fully assembled and/or fully loaded with components and sub-assemblies (including hybrids), including solder joint inspection, post paste inspection and post placement inspection, inspection and test of semiconductor chips in all stages of manufacture, from wafers to finished chips, image or video classification systems used to search image or video archives for a particular type of image or a particular type of video clip, and medical image processing applications to identify particular characteristics in an image, such as a tumor.

Referring now to FIGS. 1 and 1A, an image search and retrieval system 10 includes an image processing system 12 having an input system 14 and output system 16 coupled thereto. Input System 14 is here shown to include a graphical user interface (GUI) 14a, a facsimile system 14b, a camera system 14c which may include for example a digital camera or a camera connected to a frame grabber, a scanner 14d, a network connection 14e, a video system 14N which, may include a video camera for example, and any other means known to those of ordinary skill in the art for capturing or otherwise obtaining images and transmitting or otherwise making image data available to an image processing system.

For example, Network Connection 14e allows input system 14 to receive image data from a global information network (e.g., an internet) or on intranet or any other type of local or global network. Also coupled to image processing system 12 is an image storage device 18 which may for example be provided as image one or more databases having stored therein a plurality of images 20a–20N generally denoted 20. The images 20 may be provided as still images or alternatively the images may correspond to selected frames of a video signal which are treated as still images.

Image processing system 12 also includes an image retrieval to retrieve images from the storage device 18. Alternatively, images may be provided to image processing system 12 via the graphical user interface 14a using one of a number of commercially available drawing packages such as Microsoft Paint or any similar package. Alternatively still, a camera such as camera 14c or other image capture device may be used to feed images to the processing system 12. Thus system 12 can receive real time or "live" camera images instead of retrieving images from a database or other storage device. Alternatively still, images may be fed to the imaging processing system 12 via the facsimile system 14b, the scanner 14d or the like. Regardless of how images are fed to image processing system 12, image processing system 12 receives the images and processes them in accordance with techniques to be described below in conjunction with FIGS. 2–8B.

In general overview and as shown in FIG. 1A, a query image 20 is provided to image processing system 12 via input system 14. The image processing system 12 compares the query image 20 to each of the images in the storage device 18 and computes a quantitative value or "score" indicative of the closeness of the match to the query image. In the case where the storage device is provided as an image database, the processing system 12 accesses the database via a database query.

Image processing system 12 provides the results of the query to output system 16 in a pictorial format as a plurality of images 22a–22h. Each of the result images 22a–22h has a quantitative value 24a–24h associated therewith. The quantitative values 24a–24h indicates the closeness of the match between the query image and the image stored in the storage device 18. A quantitative value 24 closest to a value of zero indicates the closest match while higher values indicate a match which is not as close. The quantitative values allow the image processing system 12 to order the result images. The relative differences between the quantitative values associated with each image can be used to cluster groups of images based upon the closeness of the match to the query image. For instance there is a relatively large difference between the scores associated with images 22b and 22c. This provides an indication that images 22a and 22b are closer in terms of visual similarity to the query image, 20, than the images 22c, 22d and beyond. The difference in scores between 22f and 22g is much smaller than the difference in scores between 22b and 22c. This indicates that images 22f and 22g in relation to the query image, 20, are very similar. Thus, it should be appreciated that it is the relative values of the scores rather than the absolute scores can be used to order the images found as a result of the search.

Figure 2:
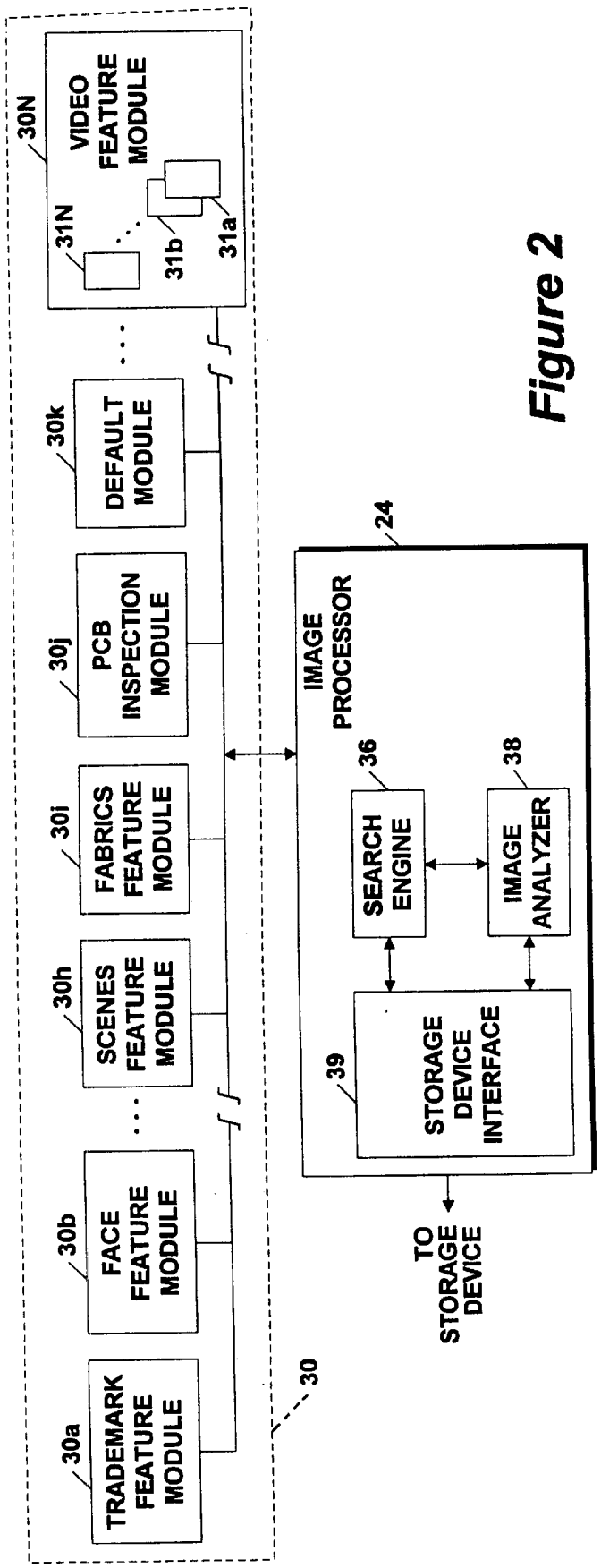
FIG. 2 is a block diagram of an image processing system including a plurality of plug-in modules.

Referring now to FIG. 2, image processing system 12 includes an image processor 24, a search engine 36, an image analyzer 38, and a storage device interface 39. Image processor 24 interfaces with one of a plurality of plug-in modules 30a–30N generally denoted 30.

The function of the plug-in-modules 30 is to provide the information necessary to describe how to optimize the image analyzer 38 for a particular application. Each of the plug-in-modules 30 define the particular regions of an image and particular measurements to make on pixels within that image region as well as the measurements to make on neighboring pixels in neighboring image regions for a given application. For example, Module 30a specifies parameters, constraints and characteristics to be used when performing trademark image searches. Module 30b specifies parameters, constraints and characteristics to be used when performing searches upon images of faces. Module 30k specifies parameters, constraints and characteristics to be used when performing searches of scenes (e.g., images of waterfalls, fields, etc.). Module 30l specifies parameters, constraints and characteristics to be used when performing searches for fabrics. Module 30j specifies parameters, constraints and characteristics to be used when performing inspection of printed circuit boards. Module 30N specifies parameters, constraints and characteristics to be used when performing searches on a stream of video images. The plug-in-modules 30 thus specify parameters and characteristics which are important in a particular image match/search routine. The plug-in-modules communicate this application specific information to image analyzer 38.

The plug-in-modules 30 may be implemented in a variety of ways. The modules 30 themselves may implement a technique that takes as input two or more image regions, compares them to each other, and returns scores of how similar they are to each other. The plug-in-modules 30 may contain a list of image attributes that are important for computing image similarity for a particular application, such as color, luminance, and texture. The plug-in modules may also suggest how to preprocess images before the images are sent from storage device interface 39 to image analyzer 38.

For example, if the query image is a trademark image and it is desirable to search the storage device 18 (FIG. 1) for trademark images, then the trademark plug-in-module 30a describes that orientation information is important. It also tells the image analyzer to ignore color information and to treat black figures on a white background and white figures on a black background in the same manner. The trademark plug-in-module may also describe how to compute orientation information and how to compact this information for more efficient processing. These techniques are more fully described in FIGS. 6–6C.

On the other hand, if the application is face recognition and the query image contains a human face, then plug-in module 30b, which corresponds to a face optimizer, would be used. The face plug-in-module 30b contains information describing that global configuration is important and relative luminance or relative color information should be used in the matching process to be robust against illumination changes. Although, not necessary, plug-in-module 30b may implement a technique that describes how to delineate the boundaries of a face in an image. This technique may be used to preprocess the query hand target images prior to analysis. Such a technique may be used to align the query and the target image (as shown in step 40 of FIG. 3).

The scene plug-in-module 30k emphasizes color and local and global structure as important attributes when comparing two scenes. The fabric optimizer 30i utilizes a weighted combination of color, texture, local and global structure in a similarity metric which takes as input two or more images of fabric samples. A video sequence plug-in-module can also be used. In the case of the video optimizer 30N, it must describe how to match one still image to another image and also how to take into account that these images are part of a time sequence. For instance, it may be important to track objects over time. It may also be important to calculate the relative position, color, or other attribute from a frame at time t1 and a frame at time t2. These calculations can be made independently for two or more image sequences. The processed image sequences may then be compared.

It is not necessary to have a predefined specialized plug-in-module in order for image analyzer 38 to compare two images. The image analyzer may use a default plug-in-module 30k, which contains generic biases to compare two or more images of unknown content. For instance, the default plug-in-module 30k utilize color, luminance, and local relative structure. If feedback is provided to the image processor 24 and the plug-in module, the default plug-in-module 30x can generate a list of associations to important image attributes. Measuring and comparing these attributes will therefore take precedence over measuring and comparing other attributes. In the learning step the default plug-in-module 30k can also identify significant internal parameters and ranges for their values. This learning or refining procedure can be applied to the default plug-in-module 30k or any of the application specific plug-in-modules 30a–30n. The learning procedure can be used to generate a set of parameters, characteristics and constraints for a new plug-in module or to train an existing plug-in-module to utilize a set of parameters, characteristics and constraints for a new application.

Many of the applications described are image search applications. The basic premise is that one or more images are provided to the image processor 24 as positive or negative examples or samples. Together these examples define a semantic class of images. The task of the image processor 24 is to search one or more images (which may be stored in one or more databases) to find other images in this class. Search engine 38 can be optimized to perform searches rapidly. In its most generic form, the search engine 38 is used to retrieve images from a storage device and to channel those images sequentially or in batches to the image analyzer. Images from the search engine 36, which are identified by the image analyzer 38 or by a user may be used to refine a search or to perform a new search. This is further explained in conjunction with FIGS. 7–12 below.

FIGS. 3–3B, 5, 7B, 10, 11D, 11E, 12 and 14 are a series of flow diagrams showing the processing performed by a processing apparatus which may, for example, be provided as part of an image processing system such as that shown in FIGS. 1 and 2 to allow processing of various types of images in a variety of different applications. The rectangular elements in the flow diagrams (typified by element 40 in FIG. 3) are herein denoted "processing blocks" and represent computer software instructions or groups of instructions.

Alternatively, the processing blocks represent steps performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to fabricate circuits, or to generate computer software to perform the processing required of the particular apparatus. It should be noted that many routine program elements, such as initialization of loops and variables and the use of temporary variables are not shown.

Some of the processing blocks can represent an empirical or manual procedure or a database function while others can represent computer software instructions or groups of instructions. Thus, some of the steps described in the flow diagram may be implemented via computer software while others may be implemented in a different manner e.g. manually, via an empirical procedure, or via a combination of manual and empirical procedures.

It will be appreciated by those of ordinary skill in the art that unless otherwise indicated herein, the particular sequence of steps described is illustrative only and can be varied without departing from the spirit of the invention.

Figure 3:
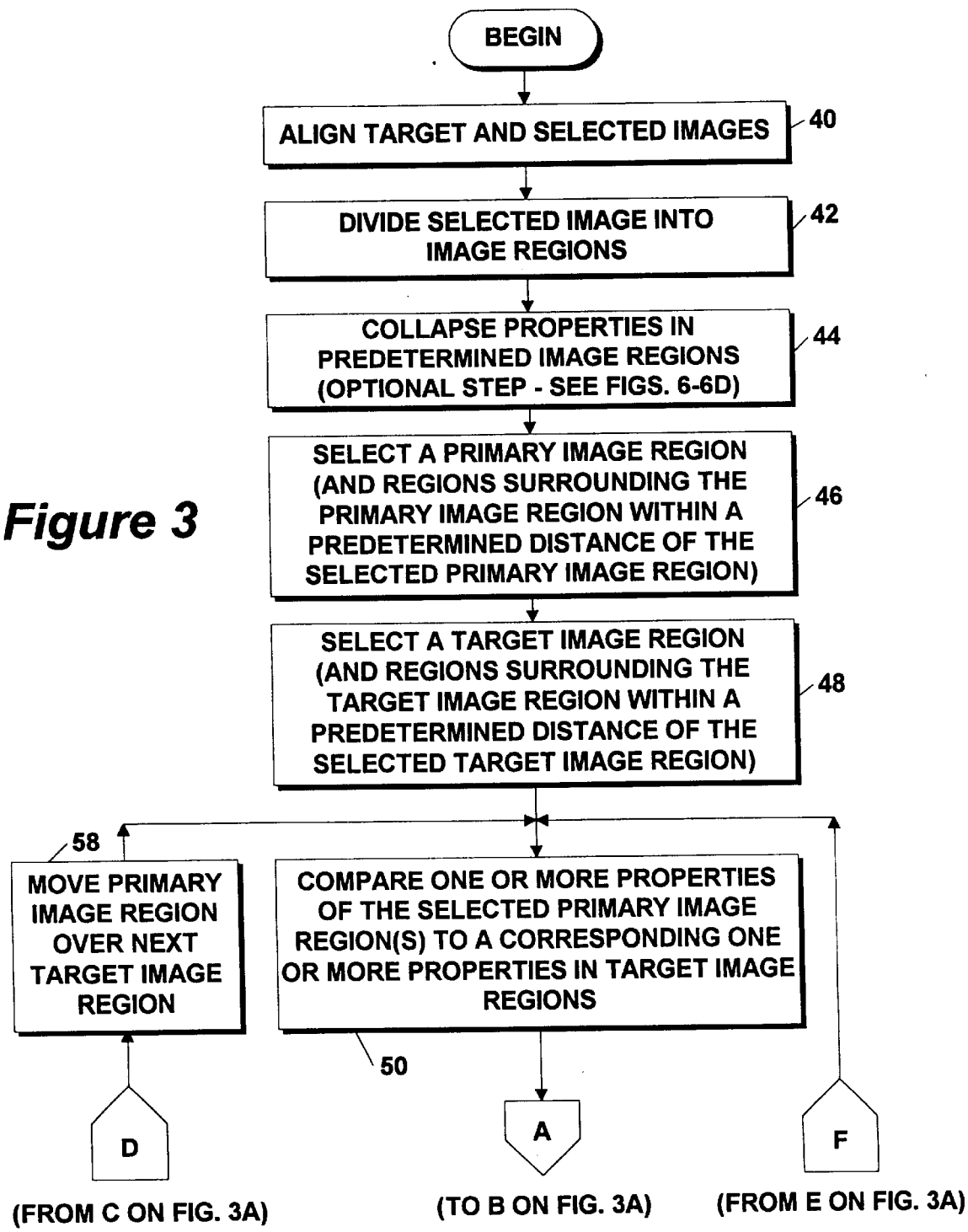
FIGS. 3–3B are a series of flow diagrams representing the processing performed by the image processing system of FIGS. 1 and 2 to compare two image.
Figure 3A:
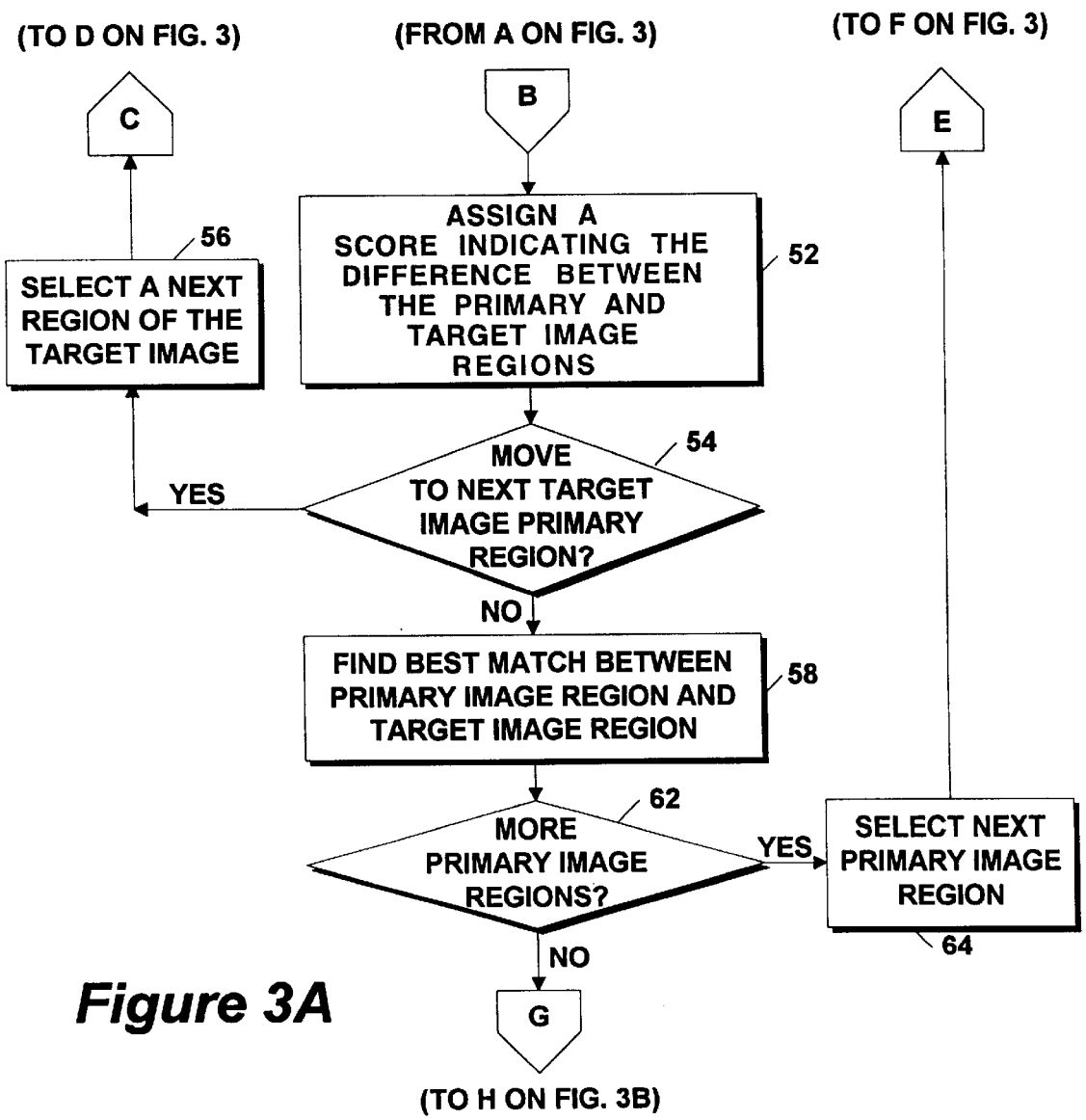
FIG. 3C is a plot of attributes from a query image and a target image.
FIG. 3D is a series of images illustrating an image after a divide and collapse operations.
FIGS. 3E and 3F illustrate deformation of a region to match a target image.
Figure 3B:
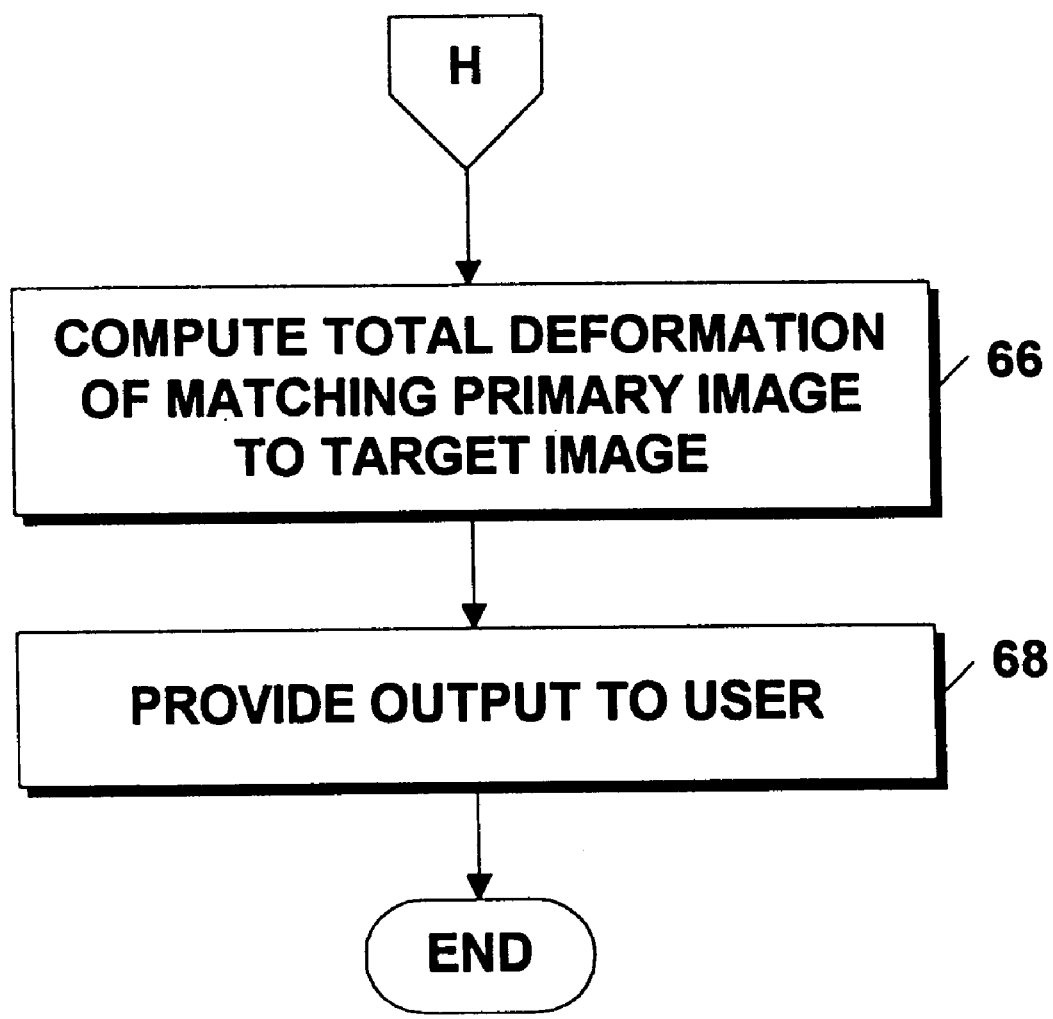

Referring now to FIGS. 3–3B, processing begins in step 40 where a selected or primary image is aligned with a target image. The primary image is the image which is to be matched to the target image. In some embodiments, the target image has been previously stored in a database (such as database 18 in FIG. 1) and is retrieved therefrom while in other embodiments the target image is not retrieved from a database.

Either after or before the alignment step, the primary and target images are each divided or segmented into a plurality of sub regions (or more simply regions) or blocks as shown in step 42. It should be noted that divide step 42 may be performed as a so-called intelligent divide. An intelligent division of the image is a procedure in which regions of pixels that have similar attributes are formed into groups. One example is to group regions according to color. For a field scene, which has a blue sky and a green field, the intelligent divide would partition the image into the blue and green parts. Another example of an intelligent divide is to group pixels that belong to the same object. For instance, in an image of a printed circuit board, the intelligent divide would group image regions that belong to the same component. In an alternate embodiment, the intelligent divide can be performed on the target images in place of or in addition to the primary image.

In step 44, the properties in predetermined ones of the subregions or blocks of the primary image are combined or "collapsed" to provide a relatively compact representation of the primary. One particular technique to collapse the data in the subregions is to get the average value of a particular parameter over the whole subregion. For instance, this collapsing step could be to find the average luminance of the sub region. Another particular technique for combining the block properties is described hereinbelow in conjunction with FIGS. 6–6C. It should be noted that step 44 is an optional step and in some embodiments it may not be necessary or desirable to perform the collapsing step. In other embodiments, however, to increase the speed in matching the primary and target images, it may be desirable or necessary to perform the collapsing step. It should be noted that divide step 42 may be performed either before or after the collapsing step 44.

Processing then flows to step 46 in which a region or block within the primary image (referred to herein as a primary image region) is selected. Each primary image region has associated therewith a set of properties or characteristics or features. In some embodiments, the primary image region and regions within a predetermined distance of the primary image region (referred to herein as neighbor regions) are used in the matching process.

In the case where neighbor regions are used, the properties of both the primary image region and the neighbor regions are used in the matching process. In one embodiment, a radius R1 is selected to determine which neighbor regions around the primary image region to include for further processing. For example, a radius of zero (i.e. R1=0) indicates that no neighbor regions have been included, where a radius greater than zero (e.g. R1=1) would indicate that at least some neighbor regions are to be included. The particular number of neighbor regions to include should be selected in accordance with a variety of factors including but not limited to the particular application, the processing speed and the relative importance of particular structure in the matching process. Thus, one reason to include neighbors in the matching process is if the structure included in the neighbor is an important consideration in the matching process. For instance, when comparing facial images, the structure of the face is very important. In all cases there should be regions corresponding to the eyes, nose, mouth, cheeks, etc . . . These must be configured in the correct spatial organization (e.g. the cheeks should be on either side of the nose). The magnitude of the radius R1 indicates the level at which the structure is important. A radius R1 having a relatively small value indicates that local structure is important. As the value of radius R1 increases to the limit of the height and width of the image, then global structure is emphasized.

It should be noted that not all the neighbor regions around the primary image region are important. For instance, when comparing images of solder joints, assuming the solder joints are arranged vertically in the image, it may be that only the regions above and below the primary region should be included in the calculations. It is also not necessary for neighbor regions to have a common boundary to the primary region. For example, one definition of neighbors could be regions that are 1 region away from the primary image region.

Processing then flows to step 48 where a target image region or block is selected. In a manner similar to the selection of the primary image region, regions which are neighbors to the target image region can also be selected. In this case the neighbor regions are with respect to the target image region. For example, a radius R2 may be used to determine the neighbor regions which are within a pre-defined distance from the target image region. In most cases the neighbors for the primary image region and the target image regions should be computed in the same fashion. If this is not the case, for instance if the radius R1 is greater or equal to 2 (i.e. R1>=2) and radius R2 is set equal 1 (i.e. R2=1), then only the neighbor regions one step away from the primary image region and the target image regions should be considered in the computation. With R2 set to zero, a comparison between one or more properties of the primary image region and the target image region is made.

Processing then flows to step 50, where one or more properties of the selected primary image region and any neighboring regions are compared to corresponding properties in the target image region and any neighboring regions. In step 52, a score indicating the difference between the primary image region and its neighbors and the target image regions and its neighbors is computed and associated with the target image region. A score, for instance, could be based upon the characteristics of luminance and position. If the radii R1 and R2 are 0, the score can be computed as a linear combination of the absolute difference in luminance and the absolute difference in position of the primary and primary target image region. If radii R1 and R2 are greater than zero, then the score can be augmented by adding in difference in luminance and position of the corresponding primary and target region neighbors. Often, the differences in the neighbors characteristics are weighed less than the difference in the regions themselves. For instance, the weights of the neighbors can be calculated by a gaussian function centered on the location of the primary image region. Other weighting functions may of course also be used.

If radii R1 and R2 are greater than zero, then relative measures can be made between the primary image region and its neighbors or the neighbors to each other. For instance, one can compute whether the neighbors have greater, less, or equal luminance to the primary image region. The same computation can be made between the primary target region and its neighbors. The difference between the primary image region and the target image region will be greater if order of these relative relationships is violated in the target image region. Differences in relative measures may be weighted and added into the total score.

Processing then flows to decision block 54 where it is determined whether it is necessary to compare the properties of the primary image region to the properties of a next target primary image region. If it is necessary to compare the primary image region to a next target image region, then processing flows to step 56, where a next target image region is selected and then to step 58, where the primary image region is aligned with the next target primary region for purposes of comparison. Processing then returns to step 48. Thus, steps 54, 56 and 58 implement a loop in which the primary image region is moved over a predetermined number of target primary image regions. In some cases, the primary image region may be moved over or compared to all image regions in the target image. In other cases, the primary image region may be moved only over a selected number of image regions in the target image.

Once decision is made in decision step 54 not to move to the next target image primary image, then processing flows to step 58 in which the best match is found between the primary image region and a target image primary region by comparing the scores computed in step 52.

Processing then flows to step 62 where decision is made as to whether more primary image regions should be processed. If more primary image regions remain to be processed, then processing flows to step 64 where next primary image region is selected. It should be noted that in some cases, each subregion of the primary image is selected as a primary image subregion for processing. In other cases, however, it may be desirable or may not be necessary to utilize each image region in the primary image. By processing fewer than all subregions in the primary image region, it may be possible to increase the speed with which a primary image and a target image can be matched. After step 64, processing returns to step 48 and steps 48–62 are repeated until there are no more primary images to process.

In decision block 62, when decision is made that no more primary image regions to process exist, processing flows to step 66 in which the best scores associated with each primary image region are combined in order to provide a score of how much deformation was required to map the primary image to the target image. One way to calculate the amount of deformation is to add together the best score associated with each primary image regions.

Processing then flows to step 68 in which an output is provided to a user.

Figure 3C:
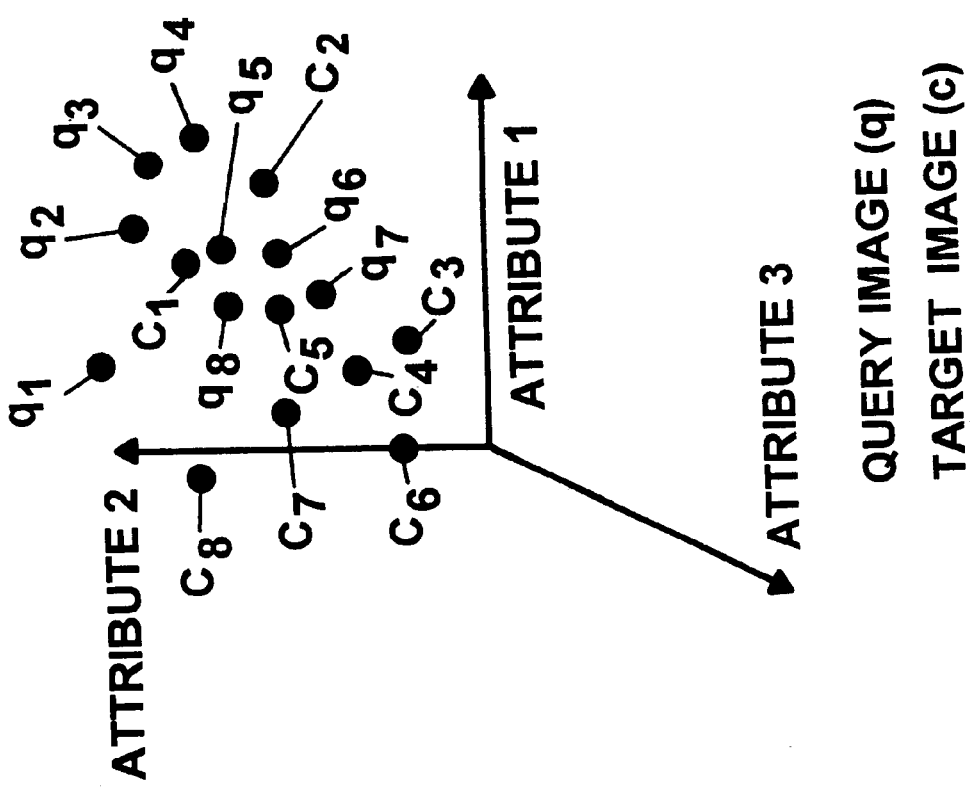

Referring now to FIG. 3C, a technique for computing a score by computing a deformation distance between a query image Q and a candidate or target image C is shown. Reference numerals $c_1$–$c_8$ represents an image region of a target image and each of the reference numerals $q_1$–$q_8$ represents an image region of a query image. Thus $q_1$ denotes the $i^{th}$ image region of the query image Q while $c_j$ denotes the $j^{th}$ image region of the target image C.

In this particular example, three different axes of a Cartesian coordinate system represent three different attributes, attribute 1, attribute 2 and attribute 3 of an image. Image regions $c_1$–$c_8$ $_{and}$ $q_1$–$q_8$ are plotted along the axis. A distance between the attributes in the query image and attributes in a candidate image are computed. The sum of the distances between the points, $c_1$–$c_8$ and $q_1$–$q_8$ are totaled and the minimum value is selected as the distance corresponding to the best match. Thus the best match is defined as the image having the least amount of deformation and with respect to the query image. The distance is computed as a function of the properties of the query image and the properties of the candidate image. The function used can be, for example, the absolute difference between the property of the is query image (denoted as prop(qi)) and the property of the $j^{th}$ candidate image (denoted as prop(cj)) multiplied by a weight value.

Referring now to FIGS. 3D–3F, an image 20' after the divide and clasp steps are performed is shown as an image 21. The primary image region and neighbor regions are shown as image region 23. Thus image region 23 is provided from primary image block 23a and neighbor blocks 23b–23p. Each of the lines 69 signify relative relationships between regions. It should be noted that here relationships between the primary image block 23a and the neighbors 2323b–23d, 23e, 23f, 23i and 23m are shown but it is also possible to define relationships between two neighbor blocks (e.g. blocks 23c and 23d).

In FIGS. 3E and 3F a primary image region 23' includes primary image region block 23a' and neighbors 23b', 23c' in an image are shown being deformed in to find a match between the primary image and a target image. It should be noted that the shape of the primary region in FIGS. 3E and 3F is not the same as the primary image region shown in FIG. 3D. In FIGS. 3E and 3F a primary image region 23' is shown being moved between two different locations on a target image 71. The deformation of the image region 23' is indicated by a spring 25. The spring 25 starts where the primary region exists in the primary image. To find a good match, the image region is moved from that spot over the target image 71. The spring 25 provides a visual indication of the amount by which the primary image is deformed to match the target image. The more the spring 25 is stretched to find a good match in the target image, the more the deformation. The spring may be implemented in a variety of ways. For example the spring may be provided a function which itself includes a function of distance moved and other properties. The spring technique may be implemented by making a distance measurement and assigning to it a weight value. The weight is selected in accordance with a variety of factors including but not limited to the emphasis which should be assigned one parameter (e.g. a distance parameter) vs. another different parameter (e.g. a color parameter). Thus, if it is desired to give greater consideration to spatial distance than some other parameter, then the weight value is selected accordingly.

Figure 4B:
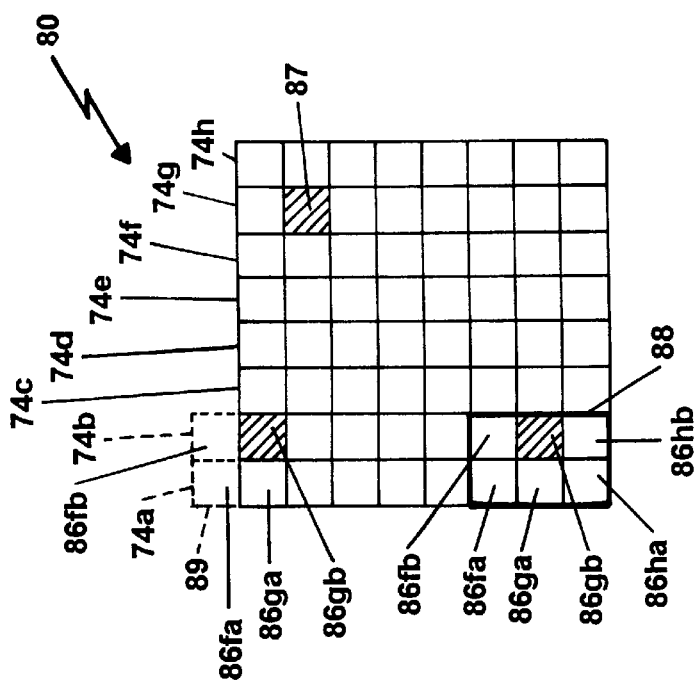
FIGS. 4–4B are a diagrammatic view the alignment of a primary image and a target image.
Figure 4:
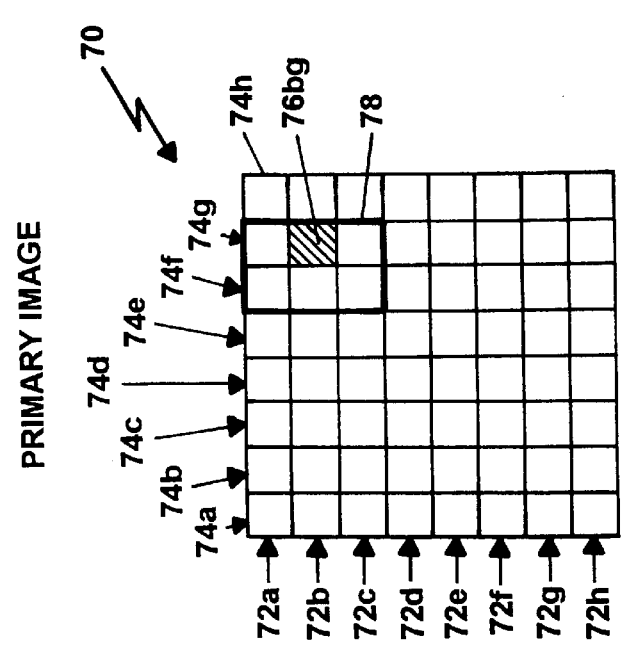
Figure 4A:
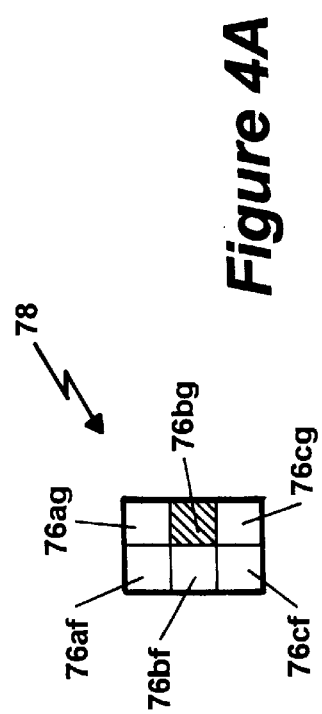

Referring now to FIGS. 4–4B, a primary image (PI) 70 has been divided into a plurality of rows, 70a–70h, and columns, 72a–72h. Although here eight rows and columns are shown, those of ordinary skill in the art will appreciate that fewer or greater than eight rows and columns may be used. Those ordinary skill will also appreciate that the number of rows need not be equal to the number of columns. Rather, the number of rows may be greater than or less than the number of columns.

Each block formed by the intersection of a row and column will be denoted as 76XX where XX corresponds to an index identifier for a particular block. For example, reference numeral 76aa denotes the block in the upper left-hand corner of image 70, while reference numeral 76hh denotes the block in the lower right hand corner of primary image 70. The block structure can be referred to as a grid.

The particular number of rows and columns to be used in any particular application to create image blocks may be selected in accordance with a variety of factors including but not limited to the desire to have distinctive or important features in the image delineated by one or more blocks. Consider a field scene in which the important regions are those corresponding to the sky and the field. It is undesirable to have a very coarse grid where many important features of the image are merged together. The most extreme example of this coarseness is to consider the whole image as one block (1 row, 1 column). In this case, it would not be possible to distinguish the sky from the field. It is also undesirable to have a grid where unimportant details in the image are separated by blocks. Consider the same field scene and a fine grid which delineates each blade of grass. In the most extreme case the blocks are made up of individual pixels.

Although primary image 70 is here shown having a square shape, those of ordinary skill in the art will appreciate that other shapes may also be used. Although primary image 70 has been divided into a plurality of square regions of the same size, those of ordinary skill in the art will appreciate that in some applications it may be desirable to use other sized or shaped regions and a different region reference method could be used. For example, in some applications processing speed could be improved or the complexity of particular computations could be simplified by selecting blocks having a rectangular, a circular or a triangular shape.

Target image 80 has likewise been divided into a predetermined number of rows and a predetermined number of columns. It is most common to divide the target image in the same manner as the primary image. In this case target image 80 has the same number of rows and columns as primary image 70.

The primary image 70 is aligned with a target image 80. This step can be performed before or after dividing the images into regions or blocks.

In primary image 70, a first primary image block, 76bg is selected. Next, a plurality of neighbors, proximate primary image block 76bg, are selected. In this case, the neighboring blocks are 76af, 76ag, 76bf, 76cf, and 76cg. The primary image block 76bg and the neighboring blocks 76af, 76ag, 76bf, 76cf, and 76cg form a selected image region After choosing a first primary region, a target image block, is selected. Also, a neighbor region is defied around the target image block. In this particular example, a first target primary block, 86gb, is identified and neighboring blocks 86fa, 86fb, 86ga, 86ha, and 86hb are also selected. Thus, a target image region 88 is defined within the target image.

It should be noted that in this particular example, the size and shape of the primary image region 78 and the target region 88 have been selected to be the same. It should be noted, however, that it is not necessary for the size of the regions 78 and 88 to be the same. For example, in some embodiments it may be desirable not to identify any blocks neighboring block 86gb. In this case, only the properties of region 76bg would be compared with the properties of region 86gb to determine a match.

As shown, however, one or more selected properties of each of the blocks within region 78 are compared with like properties of the blocks within region 88.

The region 78 is then moved to a next portion of the target image. It should be noted that for an ideal match for primary image region 76b, the ideal location should be region 86bg in the target image.

It should also be noted that in some embodiments it may be desirable or necessary to place constraints on the positions within target image 80 at which region 78 may be placed. For example, as shown in phantom in FIG. 4B, it may be desirable to not allow region 78 to be located such that one of the neighbors falls outside of the boundary of the target image, as indicated by 89 in FIG. 4B.

The neighbor properties are matched when the selected region is compared with the region of the target image but the weighting for the neighbor compares may be given less weight than the primary image region. For example, in one embodiment, a Gaussian weighting scheme can be used.

Thus, the properties of primary image region 76bg are compared with the properties of target image region block 86gb while the properties of blocks 76ag are compared with properties of block 86fb. The properties of block 76af are compared with the properties of block 86fa, the properties of 76bf are compared with the properties of block 86ga. The properties of neighbor block 76cf are compared with the properties of block 86ha and the properties of neighbor block 76cg are compared with the properties of blocks 86hb.

The appropriate plug-in module (e.g., module 30 in FIG. 1) determines what specific comparisons and properties are performed. It should be noted that this will vary from application to application. For example, in an image processing application related to inspection of printed circuit boards, one set of comparisons and properties may be used while in an application such as face detection, a second, possibly totally different set of properties and comparisons may be used. The plug-in module may specify to commit properties of a first target neighbor, 86fb, with the properties of a first primary image region neighbor, 76ag. The plug-in module may also specify to compare the relative properties of blocks with the primary and target region. For instance, the plug-in-module may specify to compute a relative property (such as relative luminance) between region 76bg and 76bf. This relative property can be compared to the relative property between the corresponding target blocks 86gb and 86ga.

If the properties are not consistent, then this factor would be taken into account when computing a total score for the match at that particular location.

The aggregate score given a primary image region, a target image region, and a set of properties is computed as a function of the difference between the each of the actual values of the properties in the primary and target region. A simple example of the function is function which increases linearly by the difference in the primary and target properties.

Figure 5:
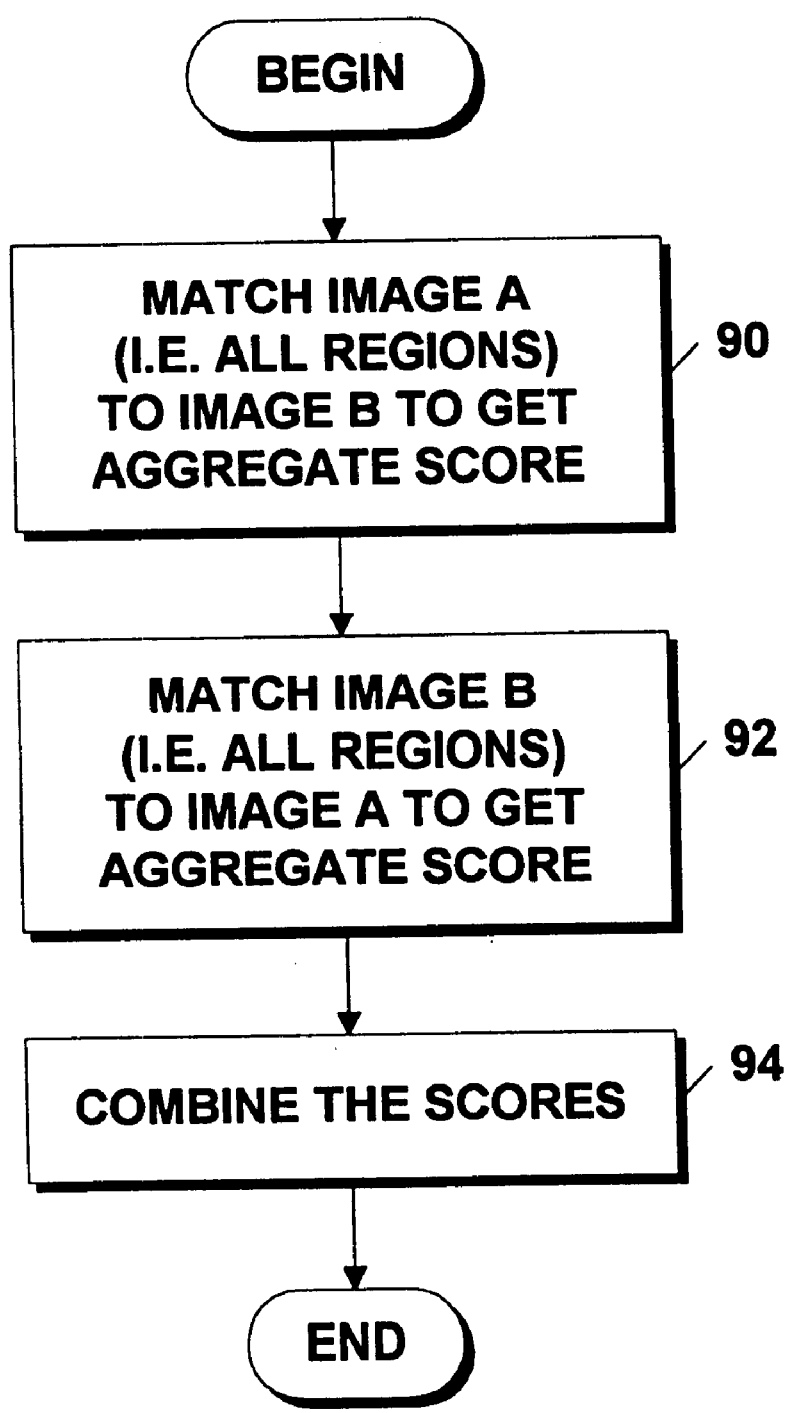
FIG. 5 is a flow diagram showing the processing performed to generate search results.

Referring now to FIG. 5, a the processing steps to make a symmetric measurement between two images is shown. The method described in FIGS. 3–3B computes how similar a primary image is to a target image. In FIG. 4, a comparison was made between the primary image 70 and the target image 80 (i.e. primary image 70 was compared with target image 80). Based on this comparison, a similarity score was computed.

If image 80 is considered the primary image and image 70 is considered the target image then the primary image 80 can be compared with target image 70 using the comparison method described in FIGS. 3–3B. Based on this comparison, a second similarity score can be computed. It is possible that the second similarity score (computed by comparing primary image 80 with target image 70) will be different than the first similarity score (computed by comparing primary image 70 with target image 80).

An example can be used to illustrate this point. Let the regions in image 70 be all black. Let one region in the center of image 80 be black and the rest white. Let luminance be the only property to be considered. When image 70 is compared to image 80, all the regions in image 70 will find an exact luminance match with the middle region in image 80. Thus, the match between image 70 and image 80 in this case is 0, the best possible match. Now, reverse the roles of the two images. When image 70 is compared to image 80, only the center black region will have a good luminance match to regions in image 70. The rest will have a high luminance difference to all the regions in 70. The match from 80 to 70 gives a low degree of similarity (or a high match score). Thus, the match computation as it stands is not symmetric.

It is sometimes desirable to have a symmetric measurement. For instance, his will help to insure that the same images are returned as the result of a database search with similar query images. For example, in FIG. 1A image 20 is used as the query image and images 22a–22h are the images found as a result of the search. If a second search were performed using one of the images 22a–22h as the query image (image 22b for example), a user would expect many of the same images 22a and 22c–22h to again appear in the results of the search. The steps shown in FIG. 5 illustrate a technique for making a symmetric measurement and, therefore, helping meet such user expectations.

Processing begins in step 90 where a first image (image A) is matched to a second image (e.g., image B) and an aggregate score is computed. The processing performed to match image A to image B is the processing described above in conjunction with FIGS. 3–4B.

Processing then flows to step 92 in which the second image (i.e. image B) is matched to the first image (i.e. image A) and a second aggregate score is computed using the processing steps described above in conjunction with FIGS. 3–4D.

Next, as shown in processing step 94, the scores from the two searches are combined to provide a composite score. The scores may be combined, for example, by simply computing a mathematical average or alternatively, the scores may be combined using a different mathematical technique which includes weighting function or other technique to emphasize one of the scores.

One could also retain the scores for each property in steps 90 and 92 of FIG. 5. Step 94 could average the score for each property independently and then combine the result into an aggregate match for image A to B and B to A.

Figure 6C:
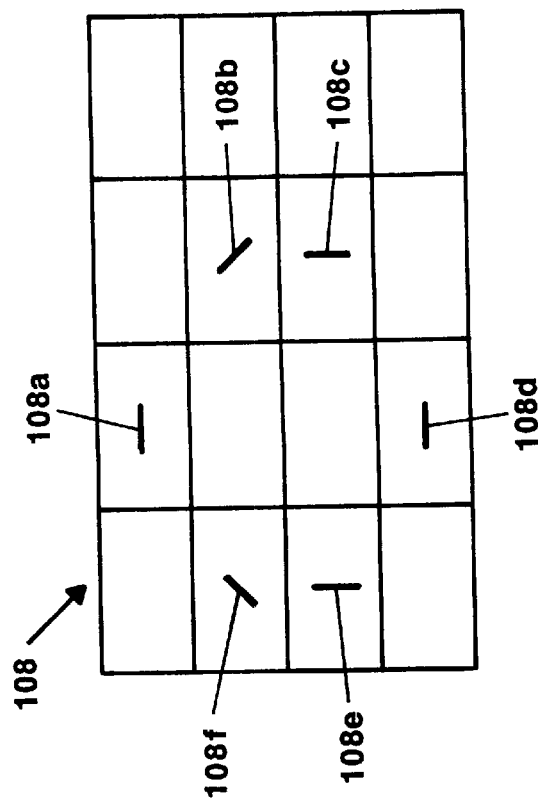
FIGS. 6B and 6C are a series of images illustrating the comparison of a collapsed core image to a collapsed database image.

Referring now to FIGS. 6–6C, an image 100 includes images regions 100a–100p. Semantically, the image represents a picture of a square having portions or lines 102a–102g as shown. Each of the image portions 102a–102g which fall within a single image region are combined or collapsed to thus represent all of the information included in each image portion in a compact manner within the image region. For example, image region 100b contains image portions 102a, 102b. Image portions 102a, 102b are thus combined and represented as an image portion 104a (FIG. 6A) within image region 100b (FIG. 6A).

Likewise image portions 102c, 102d are combined and represented as image portion 104b in image region 100h; image portions 102e, 102f are combined and represented as image portion 104c in image region 100j; and image portions 102g, 102h are combined and represented as image portion 104d in image region 100e. Thus image 102 may be compactly and efficiently represented as image 104 comprising image portions 104a–104d. Image 104 is used to perform searching within an image database such as database 18 (FIG. 1). The above process can be performed by an appropriate one of optimizers 30.

Each image within the database 18 is likewise compactly represented such that when two images are compared, a relatively large amount of image information is contained within a relatively compact representation thus allowing rapid comparisons to be made. Also, by utilizing the "collapsed image" approach, an image can be stored in a relatively small amount of storage space.

Figure 6B:
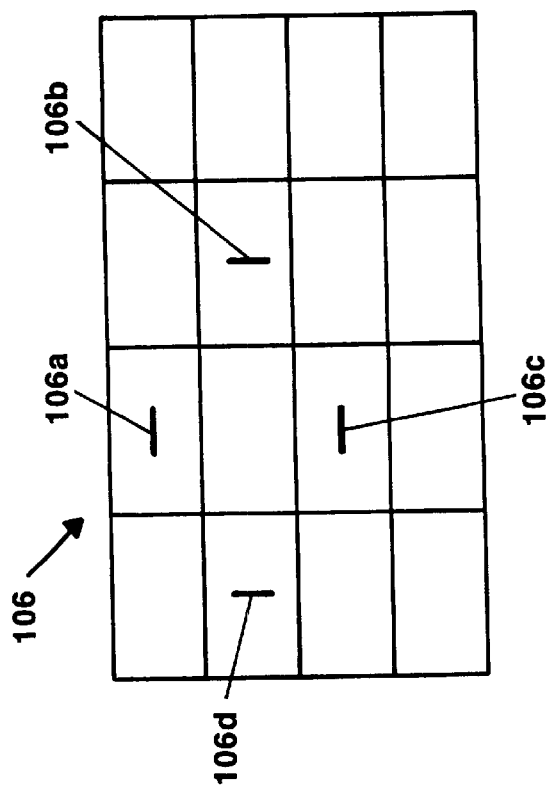

Referring now to FIGS. 6B, 6C a collapsed query image comprising image portions 106a–106d can be compared with an exemplary collapsed database image 108 comprising image portions 108a–108f. The closeness of the match of the query image 106 to the database image 108 determines the value or score assigned to the database image 108 which represent the closeness of the match between the query image and the database image. To compute a score, an assessment is made to determine how much deformation of the query image must take place to match the query image 106 with the database image 108.

For example, query image portion 106a appears in the same image segment as database image portion 108a and thus no deformation of the query image is required to match the two image portions. Query image portion 106b must be deformed or moved in a downward direction by one image segment to thus align with database image segment 108c. The same matching steps are carried out for each portion of the query image portions 106a–106d with respect to each segment and portion of the database image 108. Once each of the query image portions 106a–106d have been tested for a match then the process is repeated for the next target image which may for example be retrieved from an image database.

Figure 7:
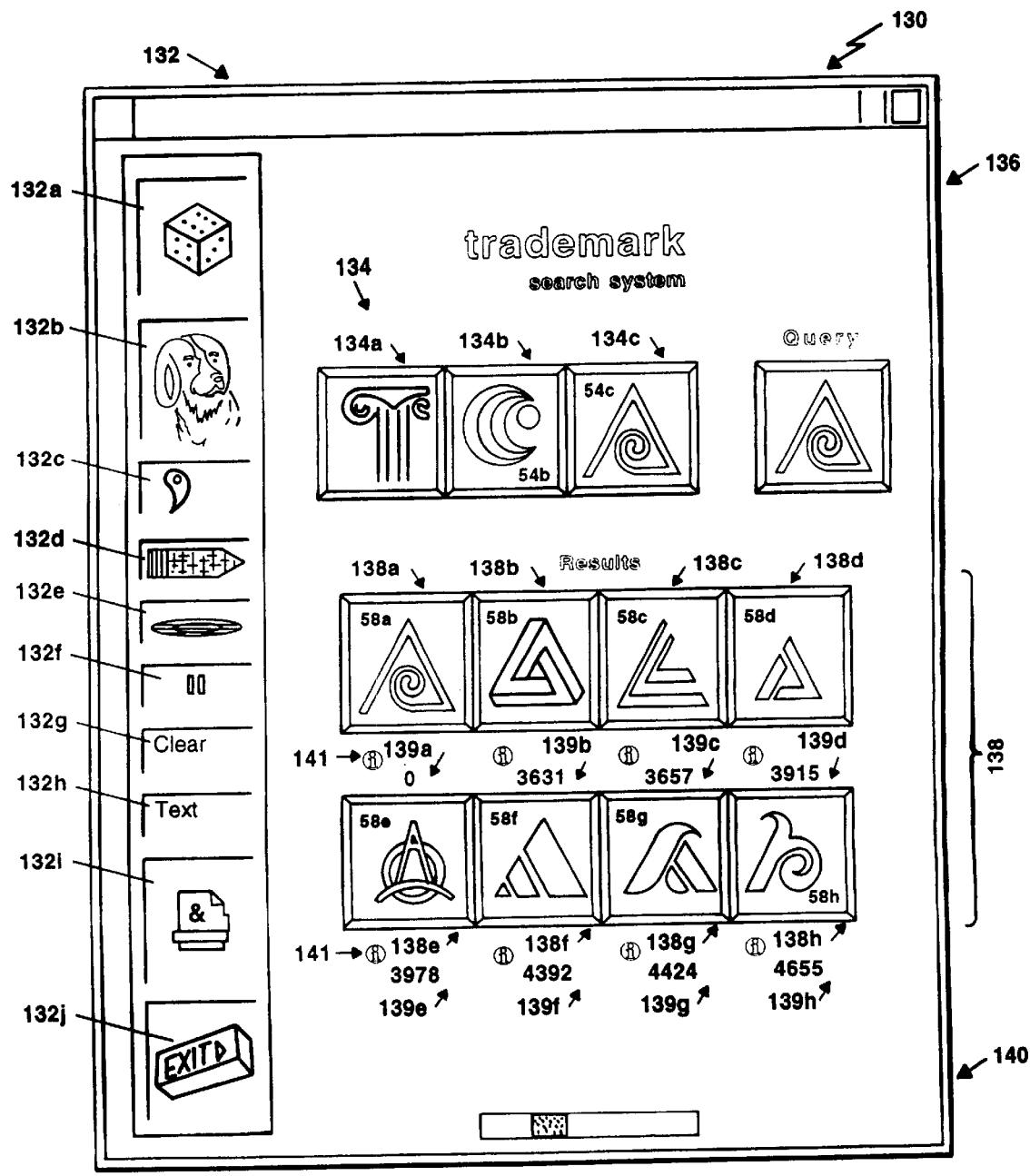
FIGS. 7 and 7A are a series diagrammatical views showing a ripple feature.
Figure 7A:
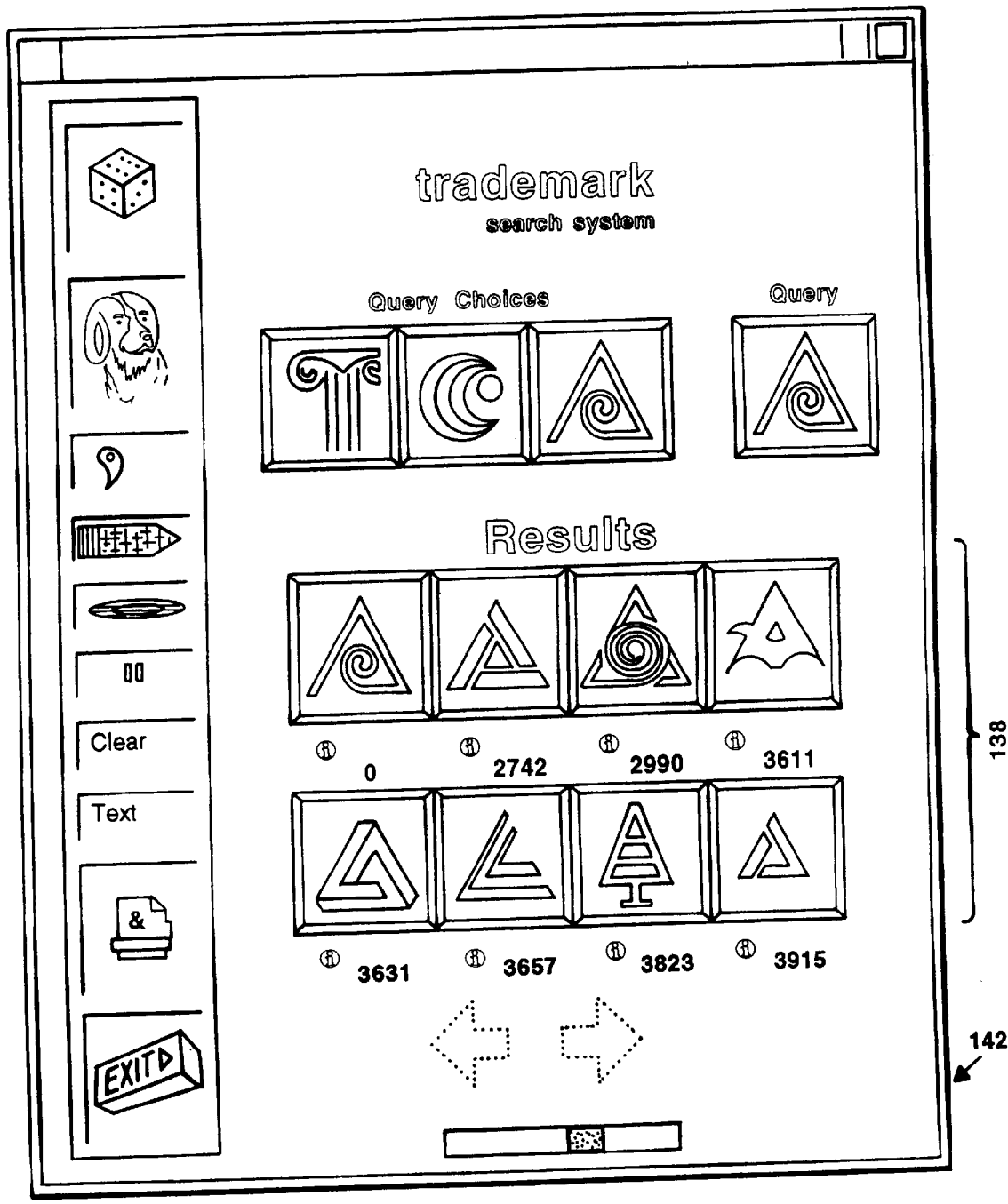
Figure 7B:
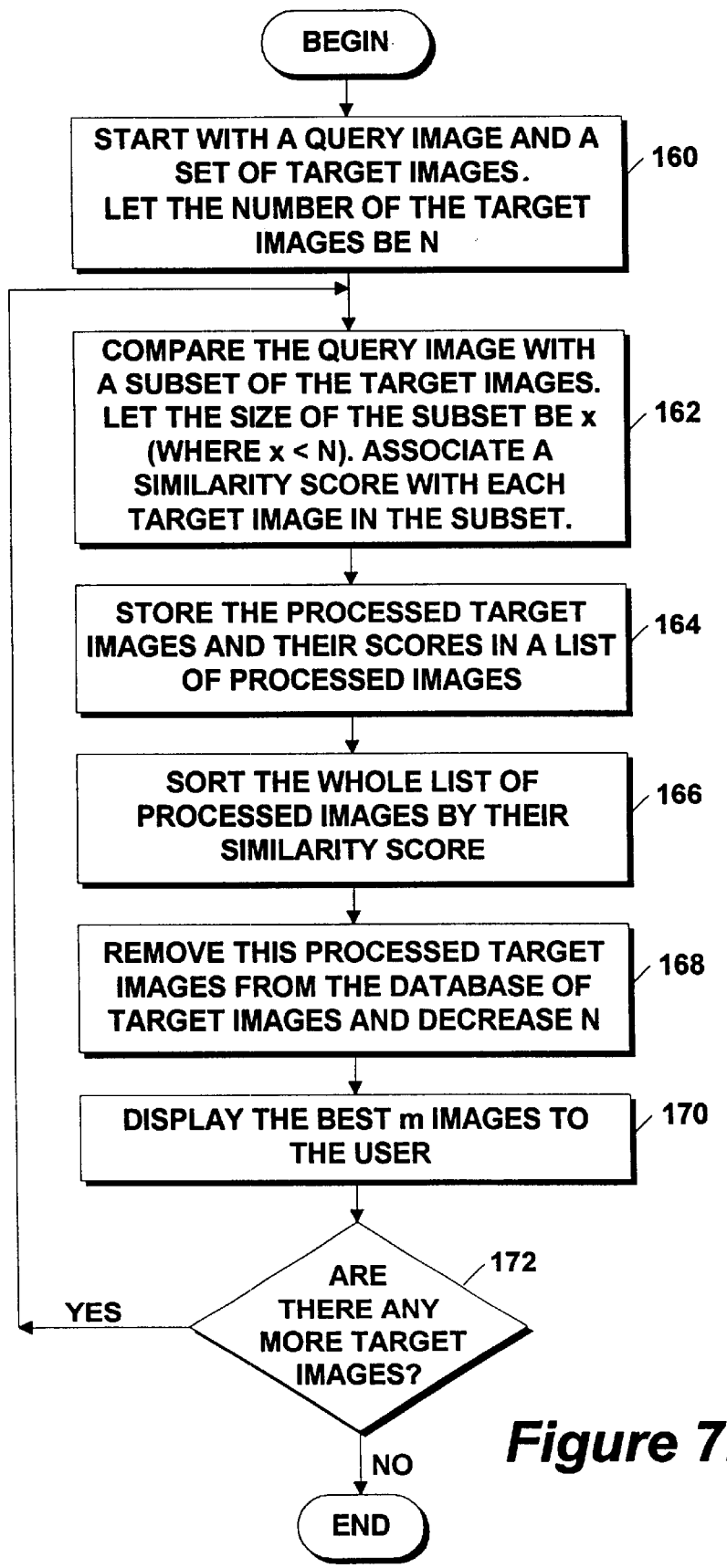
FIG. 7B is a flow diagram explaining the steps to implement a ripple feature.

FIGS. 7–7B illustrate the image processing and matching techniques described above in conjunction with FIGS. 1–6C in the context of a trademark searching system. It should be appreciated, of course, that the concepts described in conjunction with FIGS. 7–7B can also be used in a variety of other applications including but not limited to inspection systems, face recognition systems, scene classification and image search systems, biotech analysis and search systems, and fabric/textile management and search systems.

Referring now to FIGS. 7–7B, in which like elements are provided having like reference designations, an output display screen 130 includes a tool bar 132, a query image choice region 134, a selected query image region 136 and a results image region 138. Below each image 138a–138h displayed in the results region 138 is a corresponding value 139a–139h corresponding to a measure or score indicating the similarity (or match) of each of the images 138a–138h to the query image 136. As can be seen in FIG. 7, image 138a identically matches query image 136 and thus receives a score of zero (0) indicating a best possible match between the query image 136 and a target image which may, for example, be stored in a storage device such as an image database system.

It should be noted that the selected query section 136 is not limited to just one image. The results section 138 can contain 1 or more results, not necessarily eight images as here shown. Images in the results section 138 can also be selected and put into the selected query region 136.

In this particular example, a display of three images 134a–134c as query choices is shown. The rightmost image 134c (the triangle with the swirl) was chosen as the query image and placed in the query location 136. A search system using the techniques described above in conjunction with FIGS. 1–6C matched the query image 136 to images in an image database. A status bar 140 at the bottom of the display screen provides a real time or pseudo-real time qualitative indication of the number of shows how many images the system has examined in the database. In this example, the status bar 140 is approximately ⅓ the distance from the start point, meaning that the system has matched the query image to 33% of the database.

The system orders the whole database in terms of how similar each database image is to the query image. It displays the results in order of their computed visual similarity to the query image. In FIG. 7, the eight result images with the lowest scores are shown in the results section 138.

In the case of FIG. 7, the system computed the similarity scores as described in conjunction with FIGS. 1–6C between the query image 136 and all the images in the database. The scores were associated with their corresponding image in the database. The images in the database can thus be sorted or ordered based on these similarity scores. These scores values are noted as 139 in FIG. 7. It is not necessary, however, to use the method described in conjunction with FIGS. 1–6C to compute similarity. Other algorithms may be used to compute the similarity between the query image and the images in the database. The images in the database, thus, can be ordered based on these different types of calculations.

As can be seen from FIG. 7, the search results of those images determined by the search system to most closely match the query image are displayed. In this particular example, the closest eight (8) matching images from the database are displayed to a user along with the similarity scores. An information button 141 next to each result image 138 provides a means to retrieve information related to the image. For instance, in this case the images correspond to trademark images. Thus, the related image information may include the name of the entity who owns and or who filed the mark, the filing date of the mark, the date of registration of the mark (if any), and the class of goods with which the marked is used.

In the case of an inspection system, such as a printed circuit board inspection system, the images may correspond to circuit components or printed circuit boards. In this case, the related information could correspond to information about the component type or include manufacturing information related to the printed circuit board or circuit component.

It should be noted that the display may be dynamically updated during a search. By comparing the position of images 138a–138h in FIG. 7 to their positions in FIG. 7A, a so-called "ripple feature" of the search system is revealed. As mentioned above, FIG. 7 showed the state of the image search after processing 33% of the images in the database. As can be seen from the status bar 140, FIG. 7A shows the state of the image searching system after processing about 66% of the images in the database. By dynamically displaying the images, the top eight images are periodically updated (e.g. after every few seconds) to show the best images at any one discrete instant in time.

For example, by comparing the order of the result images from 138 in FIG. 7 to the order of the result images 138 in FIG. 7A, it can be seen that image 138b has moved from its position in FIG. 7 as the second best image (after about 33% of the images to be processed in the database have been processed) to a position in FIG. 7A as the fifth best image (after about 66% of the images in the database have been processed). This indicates that three images which have been processed in the middle third of the database match the query image more closely than image 138b which was found in the first third of the database.

Such image updates can be provided to a user in real or pseudo real time. A user viewing this dynamic update process in which some images move from one location to another, some images move off the display, and other new images appear on the display the effect appears as a "ripple effect."

Referring now to FIG. 7B, a flow diagram explaining the steps required to implement the above described "ripple effect" are shown. It should be noted that this particular example, (as well as the description provided above in conjunction with FIGS. 7 and 7A), assumes that a set of images are stored in an image database. However, the concepts described herein above and below can be used regardless of whether the images are stored in a database or other storage device. It should also be noted that the example in FIGS. 7 and 7A have only one query image. The concepts described can be used with multiple query images as described hereinbelow in conjunction with FIGS. 11–11B.

Processing begins in block 160 where a query image and a set of target images are selected for processing. Typically, a predetermined number of target images (N) are selected for processing. Processing then proceeds to block 162 in which the query image is compared with the subset of the target images. The comparison may be accomplished using the techniques described above in conjunction with FIGS. 3–3D. The size of the subset of time target images may be denoted as "x" where x is less than a predetermined number of target images N. (Note, that it is not necessary to have "x" be the same value across all iterations of the loop 162–172). A similarity score is associated with each target image in the subset.

Processing then proceeds to block 164 in which the processed target images and their respective scores are stored in a list of processed images. Next as shown in block 166, the list of processed images are sorted by their similarity score.

In block 168, the set of processed target images are moved from the database of target images and the value of N is decreased. In this example, the number of images left to process denoted as N, is decreased by a value corresponding to x. Processing then proceeds to block 170 where the best M images are displayed to the user. Processing then flows to decision block 172 where decision is made as to whether there are any more target images to be processed. If there are more target images to be processed, processing flows to block 162 and the processing in block 162–170 is repeated until there are no more target images to be processed.

Figure 8:
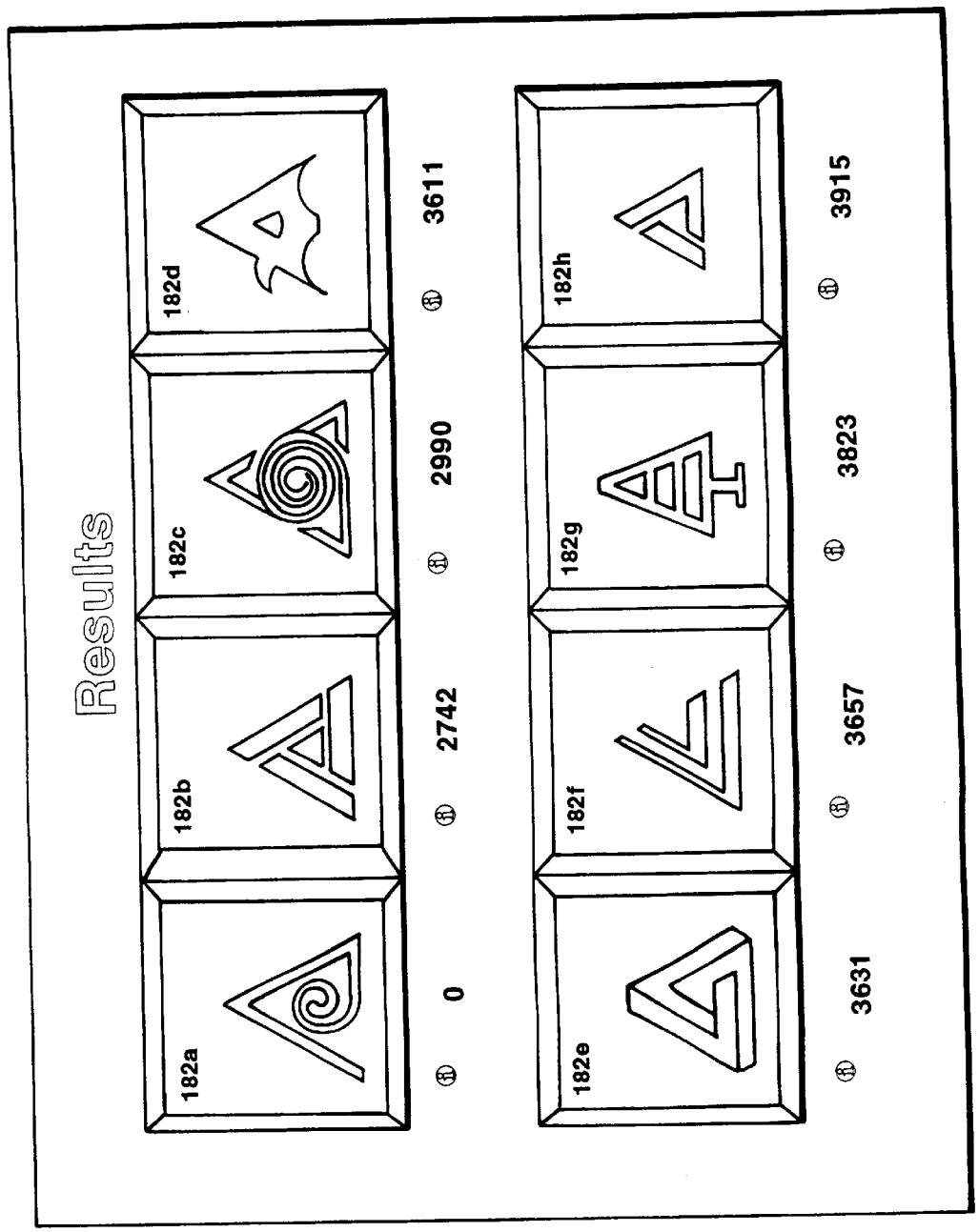
FIG. 8 is an illustration of the selection of one or more resulting images from an image search.

Referring now to FIG. 8, a visual display 180 of images 182a–182h resultant from an image search is shown. It should be noted that an image search may be interrupted or stopped before completion in which case images corresponding to result images at that point in time will be displayed.

It may be desirable to be able to stop the search and view the result images at times prior to the completion of the search (e.g., prior to completion of all images in a database) since any of the resulting images 182a–182h can be selected and used as starting points for a new search. For example, as shown in FIG. 8, image 182c is selected and an image processing system (e.g., system 10 in FIG. 1) can use the image 182c as the query image to perform the search.

It may also be desirable to stop the search so that any result images 182a–182h that are interesting to the user can be stored. In FIG. 7, element 132f corresponds to a pause button that may be used to stop the processing. Engaging (e.g. "clicking" or pressing or selecting the icon with a pointer) the icon 132f resumes the search.

Furthermore, by allowing the search to be interrupted, a user watching the visual display can stop the search if a match is found without waiting for the image processing system to complete a search of the entire database thereby decreasing the amount of time needed to satisfy a query; in this case finding a similar or infringing trademark.

It should be appreciated that although the images 182a–182h in FIG. 8 are here shown as arbitrary shapes, the same principles apply, for example, to processing and inspection of printer circuit boards and integrated circuits. For example, in a printed circuit board processing system, the images stored in the database could correspond to images of satisfactory and/or unsatisfactory solder joints or component placements. In this case, an image of a printed circuit board (or portion thereof) being fabricated or inspected would be compared to the previously stored images in the database. By matching the image of interest to an image in the database, a decision as to whether a satisfactory/unsatisfactory solder joint or component placement exists can be made.

Figure 9B:
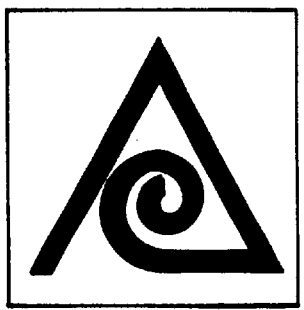
FIGS. 9–9F are a series of images which illustrate how a series of images which illustrate how a query image may be obtained and how to emphasize one or more portions of a query image.
Figure 9A:
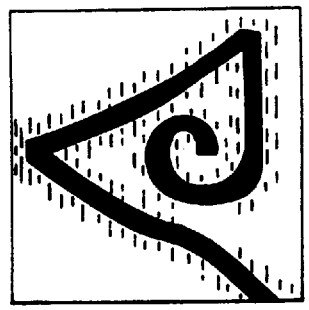
Figure 9D:
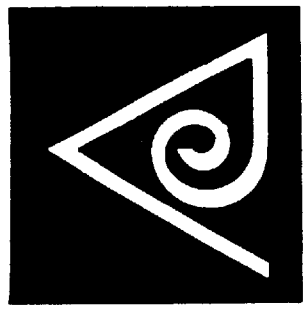
Figure 9:
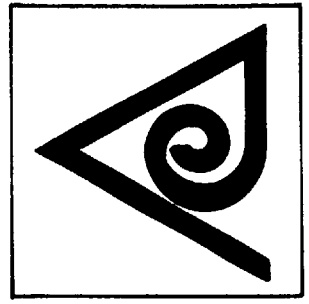
Figure 9C:
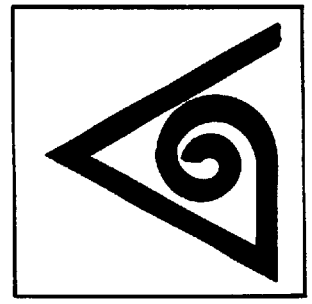
Figure 9F:
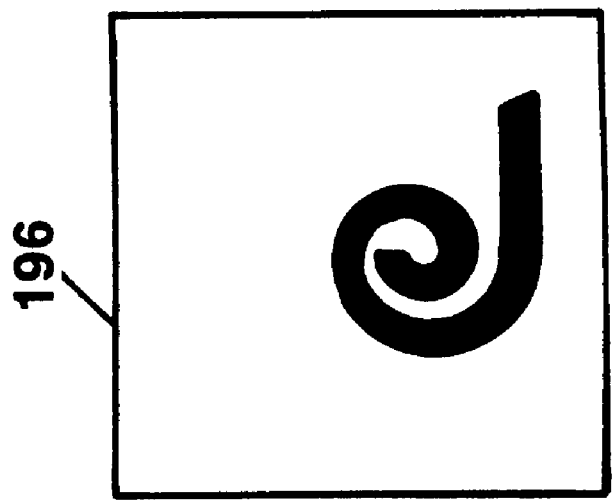

Referring now to FIGS. 9–9F, the manner in which a query image may be obtained is shown. The query image may be an existing image in the database, as shown in FIGS. 7 and 7A. (FIG. 9 shows the query image used to perform the search.) The query image may be scanned in from a hard copy or captured from a camera. It may be hand drawn as shown in FIG. 9A. The query image may be a manipulated version of the known image. For instance, FIG. 9B shows FIG. 9 rotated in the image plane clockwise 90 degrees. FIG. 9C shows FIG. 9 flipped about a vertical axis. FIG. 9D shows FIG. 9 contrast inverted. The query image may also be one of the resulting images after an initial search is performed (as discussed above in conjunction with FIG. 8).

Figure 9E:
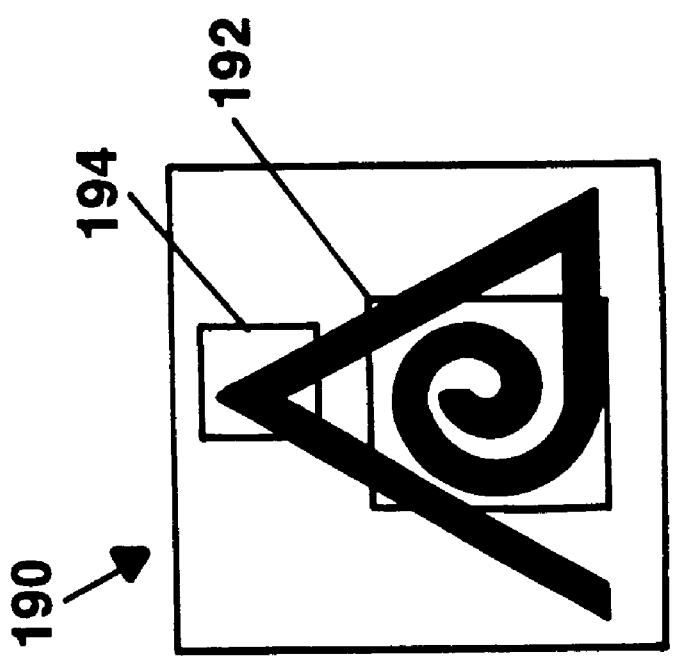

Referring now to FIGS. 9 and 9E–F, the manner is which one or more portions of a query image may be emphasized is shown. FIG. 9 shows a query image 190. Portions of this image may be emphasized according to their importance. FIG. 9E shows two regions 192, 194 marked as significant. The region 192 corresponds to the swirl area of the image 190. This indicates that the swirl pattern of the image should be more heavily weighted than the rest of the image for the matching process. The region 194 corresponds to the triangular area of the image 190. This indicates that the triangle shape at the scale of region 194 of the image 190 should be considered to be more heavily weighted than the rest of the image for the matching process.

Also a relative relationship can be defined between each of the selected image regions; such as between regions 192, 194. An example of a relative relationship between regions is a spatial relationship. In the case of FIG. 9E a region similar to 192 should be "below" a region similar to 194. If two regions in a target image are found to match well with regions 192 and 194 and the previously defined relative relationship is satisfied in this target image, then this match should be more heavily weighted than one where the relative relationship is violated.

It should also be noted that portions of the image may be removed or erased to completely de-emphasize a feature. For instance image 196 in FIG. 9F corresponds to image 190 with the triangle portion completely erased. Thus image 190 can be modified to provide image 196 which shows only the "swirl" section. The image 196 can then be used as the query image.

Figure 10:
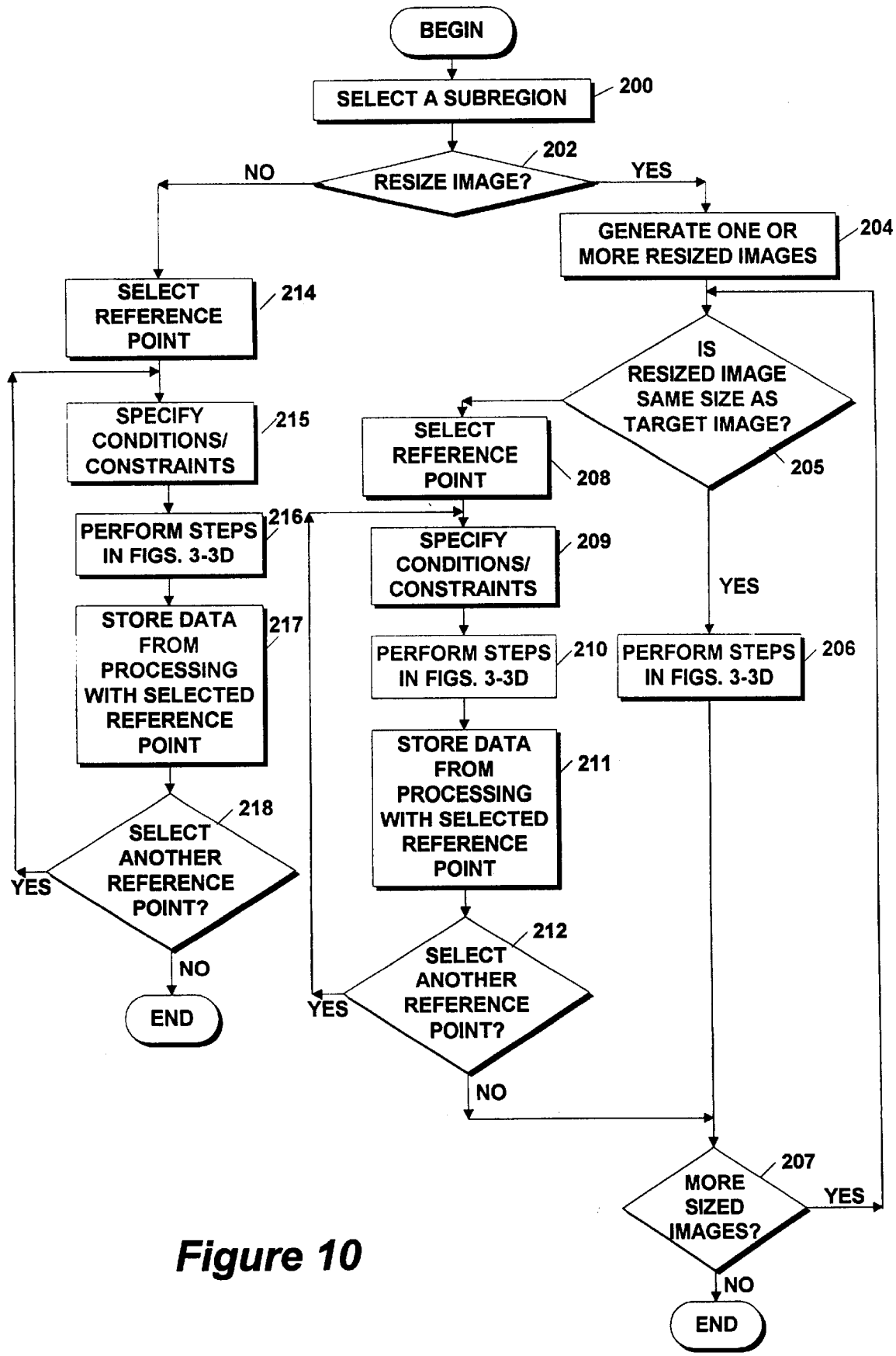
FIG. 10 is a flow diagram illustrating the steps to process a target using multiple subsections of a primary image.
Figure 10C:
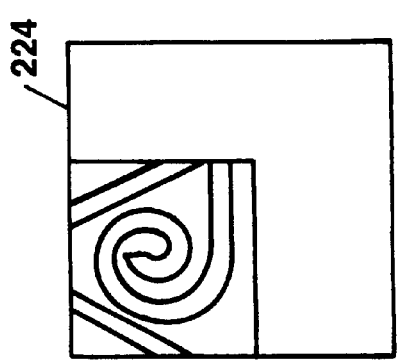
FIGS. 10A–10C are a series of images illustrating the placement of a selected image region on a target image.
Figure 10B:
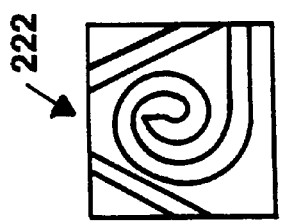
Figure 10A:
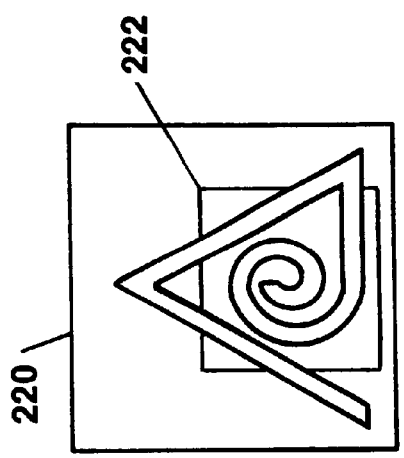

Referring now to FIGS. 10 and 10A, the processing which takes place to process an image using a selected portion of an entire image is shown. Processing begins in step 200, where a subregion of a primary image ("primary subregion") is selected. As shown in FIG. 10A, an entire image 220 has a subregion 222 selected.

Processing then flows to decision block 202 where decision is made as to whether the target or the primary subregion should be resized. If decision is made to resize one of the images (e.g. the primary subregion), then processing flows to block 204, where the one or more resized images are generated. It should be appreciated that in some applications it may be desirable to resize the target image and the primary subregions such that they are the same size, in which case processing then flows to block 206 and steps performed in conjunction with FIGS. 3–3D are performed. In other applications, however, it may be desirable to generate a so-called image pyramid.

Processing then flows to decision block 207 in which decision is made as to whether any more resized images remain to be processed. If more images remain to be processed then processing returns to block 205. If no more images remain to be processed then processing ends.

In the image pyramid case, each image in the image pyramid corresponds to the primary subregion at a different scale. In this case, each scaled primary subregion is compared to the target image and the origin of each of the images in the image pyramid are aligned at a particular location with the target image. Then processing to compare the images in accordance with steps explained above in conjunction with FIGS. 3–3D is performed as shown in block 206. It should be understood that the origin of each of the images in the image pyramid can be placed at multiple different locations in the target image and a comparison between the pyramid image and the target image is made in accordance with the processing explained above in conjunction with FIGS. 3–3D. This is done by proceeding through steps 208–212 in FIG. 10 for each pyramid image. The processing performed in blocks 208–212 is the same as that performed in blocks 214–218 and will be explained below in conjunction with blocks 214–218.

If in decision block 202 decision is made to not resize an image, then processing flows to block 214 where the origin of the selected region is aligned with a reference point in the target image are selected.

Processing then flows to block 215 where certain conditions and constraints are specified. For example, boundary conditions may be specified. The boundary conditions can, for example, place limits on the positions at which region 222 may be placed relative to the target image. For example, one boundary condition may be that no portion of region 222 may lie outside any region of the target image.

When selecting the origin, care should be taken to not select a reference point which causes the subregion (e.g. region 222 in FIG. 10A) to move outside the boundaries of the target image. Such a constraint may be useful to decrease the amount of time required to match the selected subregion to the target image because many of the possible reference points in the target image will be invalid. Usually, these invalid reference points are in the top, top-right, and right portions of the target image, forming a rotated L shape.

In some embodiments it may be desirable to specify the boundary conditions prior to selecting a reference point. Regardless of the order in which steps 214 and 215 are performed, the boundary conditions are compared with the selected reference points to determine whether a selected reference point is valid.

In this particular example, subregion 222 is assumed to have an origin at its upper left-most corner. It should be appreciated, however, that other origins could also be selected for subregion 222. For example, the lowermost right hand corner of subregion 222 could also serve as the origin. Thus, although in this example, the origin is assumed to be in the upper left hand corner, it is not necessary for this to be so.

Once the origin of the subregion 222 and its reference point in target image 224 are identified, it is then possible to place subregion 222 at that reference point in in target image 224. In this particular example, the subregion 222 is shown having its origin located at the same position as the origin of the target image 224.

If the subregion and the target image are not the same size, it should be noted that it is not necessary to place the origin of subregion 222 at the origin of the target image 224. The origin of subregion 222 may be placed at any location within target image 224 as long as all other constraints (including boundary conditions) are satisfied.

It should be noted that in some applications it may be desirable to select more than one region in the primary image for matching to the target image. This is illustrated in FIG. 9F where regions 226, 228 are selected. In the case where two image regions are selected, in steps 214 and 215, reference points in the target image for each of the sub regions must be identified and constraints between properties of the two selected image regions should be taken into account.

Processing then flow to block 216 where the processing to compare the images in accordance with steps explained above in conjunction with FIGS. 3–3D is performed. The data from processing with selected reference points is stored in a storage device (e.g. a processor memory) and processing move to decision block 218 where it is determined whether another reference point should be selected.

If in decision block 218 decision is made that more reference points remain to be processed, then processing returns to block 215. If no more reference points remain to be processed then processing ends.

Figure 11:
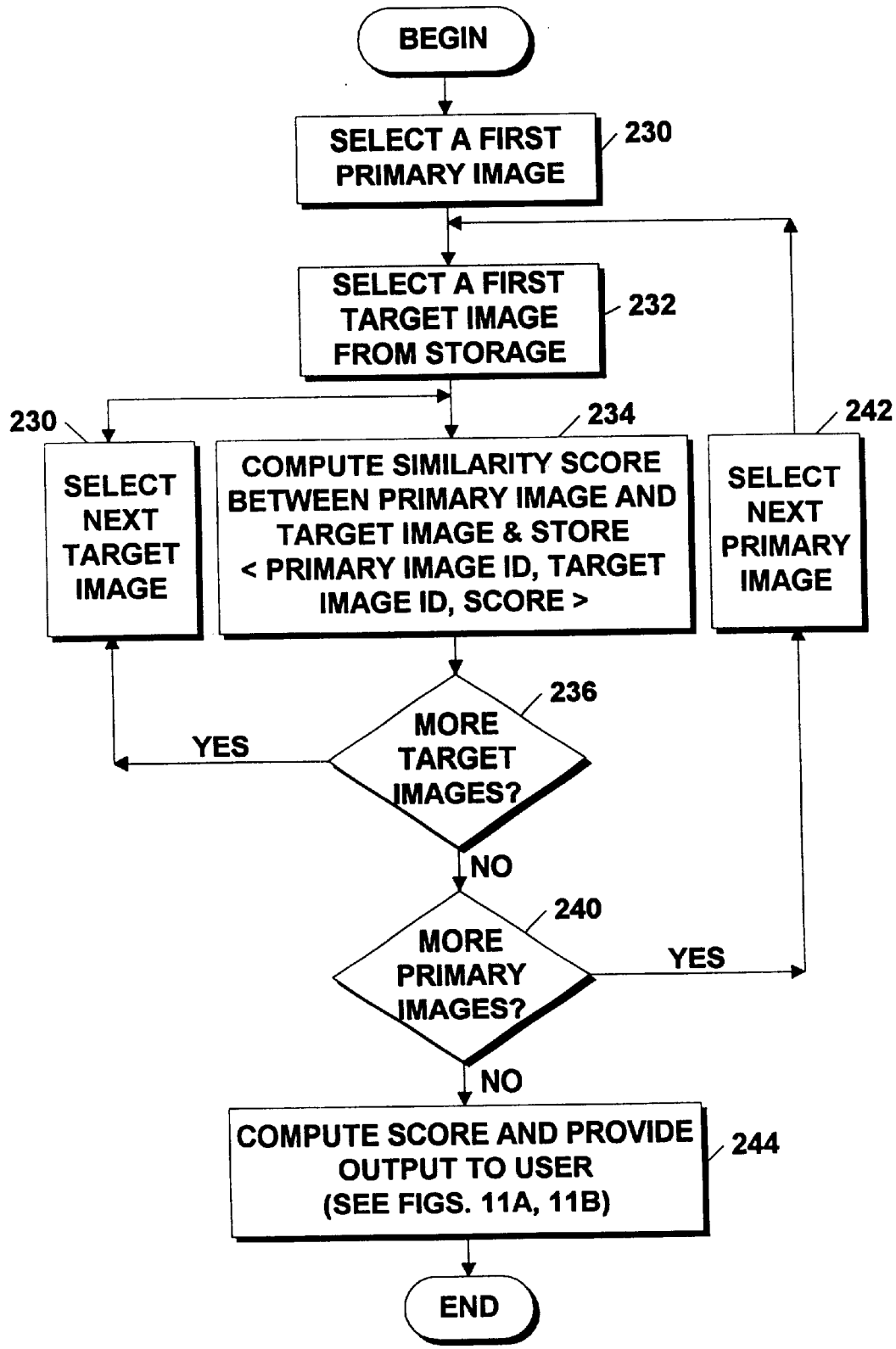
FIG. 11 is a flow diagram showing the steps to compute a score and provide an output to a user.
Figure 11A:
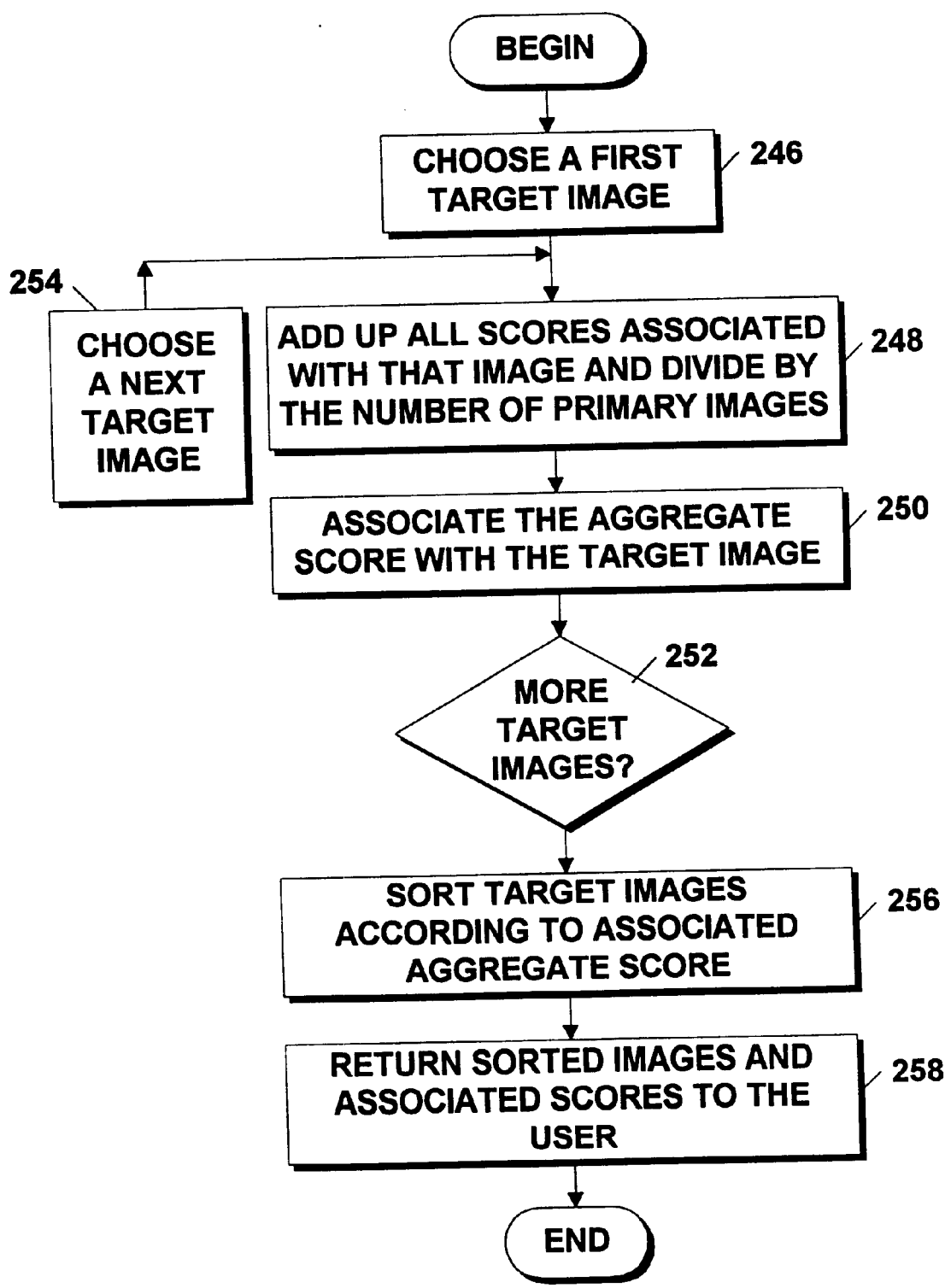
FIG. 11A is a flow diagram showing the steps to compute an aggregate score.
Figure 11B:
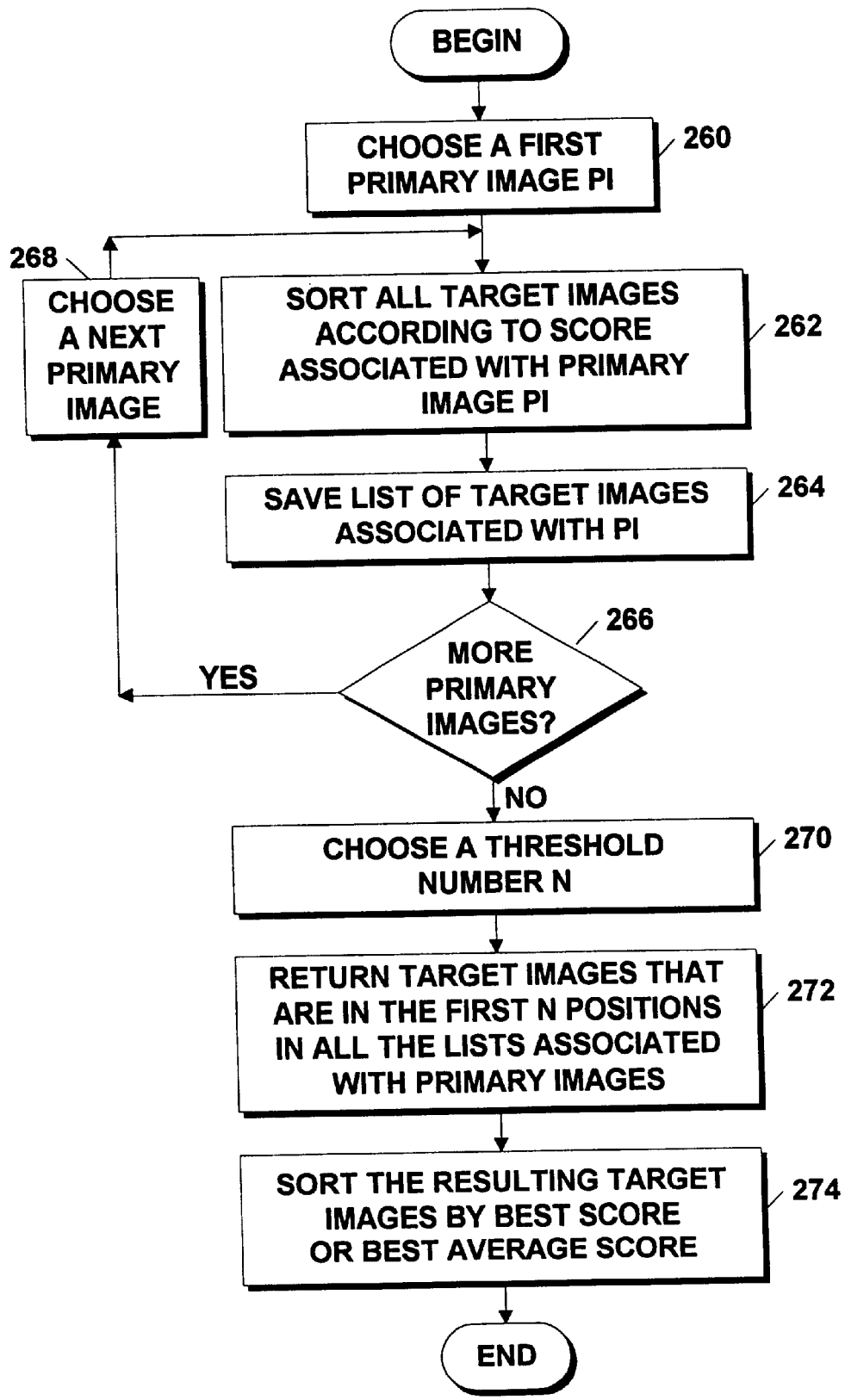
FIG. 11B is a flow diagram showing the steps to compute a score using the intersection method.

The query to image processing system 12 (FIG. 1) may contain more than one image. FIG. 11 describes a general technique to match multiple query images to a set of target images. FIGS. 11A and 11B describe two methods to compute an aggregate score for each target image and to provide output to a user.

Turning now to FIG. 11, processing begins in step 230 where a first primary image is selected. Processing then flows to step 232 where a first target image is selected from a storage device. In Step 234, a similarity score between the primary image and the target image is computed and record consisting of a primary image identifier, a target image identifier and the score associated with the target and primary image is stored in a storage device which may be a temporary storage device (e.g. a random access memory—RAM) or a permanent storage device such as a magnetic tape or compact disc read only memory (CD ROM).

Processing then flows to decision block 236 where decision is made as to whether more target images should be processed with the same primary image. If decision is made to process more target images, then processing flows to block 240 where a next target image is selected and a similarity score between the primary image and the next selected target image is again computed. The primary and target image identifiers and the associated score are again stored in a storage device. This loop is repeated until it is not desired to select anymore target images.

Processing then flows to decision block 238 where decision is made as to whether more primary images should be processed. If a decision is made to process more primary images, then processing flows to Step 242 where a next primary image is processed and blocks 232 through 242 are repeated until it is not desired to process anymore primary images. Processing then flows to block 244 where a score is computed and an output is provided to a user. The particular manner in which these scores could be computed is described below in conjunction with FIGS. 11A and 11B.

FIG. 11A describes a method for calculating an average score for each target image over all the primary or query images. This is one of many techniques that may be used in step 244 of FIG. 11. In FIG. 11A processing begins in processing block 246 where a first target image is selected. In block 248 all records with the target id are retrieved from the storage device. The scores associated with that image are added and divided by the number of primary images.

Processing then flows to block 250 where the aggregate score is associated with the target image. Processing then flows to decision block 252 in which decision is made as to whether more target images should be processed. If more target images should be processed, then processing flows to block 254 and blocks 248 and 250 are repeated. This loop is repeated until there are no more target images to process. When decision is made in decision block 252 that there are no more target images, then processing flows to block 256 in which the target images are sorted according to their aggregate score. Processing then flows to block 258 in which the sorted images and associated scores are provided to the user. Such output may be provided in the form of a visual display, an audio display or a printed display.

FIG. 11B describes a different approach to combining scores from multiple query images. In FIG. 11B, processing begins in block 260 where a first primary image is selected. Processing then flows to block 262 where all records with the primary image id are retrieved. From this set of records all target images are sorted according to the score associated with the primary image. In block 264, the list of sorted target images and their scores which are associated with the primary image are stored in a storage device. In decision block 266, decision is made as to whether more primary images should be processed. If decision is made to process more primary images, then processing flows to block 268 in which a next primary image is selected and processing then flows to blocks 262 to 264.

If in decision block 266 a decision is made to not process more primary images, then processing flows to block 270 in which a threshold number is selected. In block 272, target images that are in the first N positions in all the lists associated with the primary images are identified. In block 274, the resulting subset target images are sorted by best score or best average score and provided to a user. The information may be provided in the form of a visual display, an audio display or a printed display or using any other display technique well known to those of ordinary skill in the art.

There are many other techniques to compute a similarity score based on a multiple set of query or primary images. For example one may match each primary image to each of the target images individually. A score is then associated with each target image and this record is put into a list. The list can be sorted based on the computed scores. The system should return a non-duplicative set of images that have the lowest individual score to at least one primary image.

Rather than trying to combine multiple scores derived from multiple primary image, one may calculate the common characteristics across the primary images to produce a new "condensed" query image that embodies those characteristics. The matching may be performed using this new query image and a target as described in FIGS. 3–3B. The output is a similarity score between the condensed query image and the target. Target images may be sorted based on their respective scores.

Alternatively still one may match multiple query images to each other before processing the target images. The goal is to find the system parameters that find the most consistent, best similarity scores calculated between query images. In other words, the goal is to find the system parameters that best explain the similarities between the query images. These system parameters and one or more of the query images may be used to calculate a similarity score to the target images.

It should also be noted that the query may be refined using positive examples. The results may be calculated by one or more query images. The system parameters may be refined by having the user choose images from the result set as "positive examples". One way to refine the parameters is to alter the them such that the resulting measure of similarity gives the lowest (or best) possible scores to the positive examples.

Alternatively, it should also be noted that the query may be refined using negative examples. The results may be calculated by one or more query images where now the user may specify both positive examples (images that fit a particular criteria or embody the perceptual concept) and negative examples (images that do not embody the perceptual concept). One way incorporate positive and negative examples is to alter the system parameters such that the resulting measure of similarity produces a maximal difference between the scores for the positive examples and the negative examples. Another method is to compute the commonalities between the positive examples and then to remove any features contained in the negative examples. A new query images that embodies the characteristics of the positive examples and does not contain the characteristics of the negative examples may be reduced and used to perform the matching.

Figure 12:
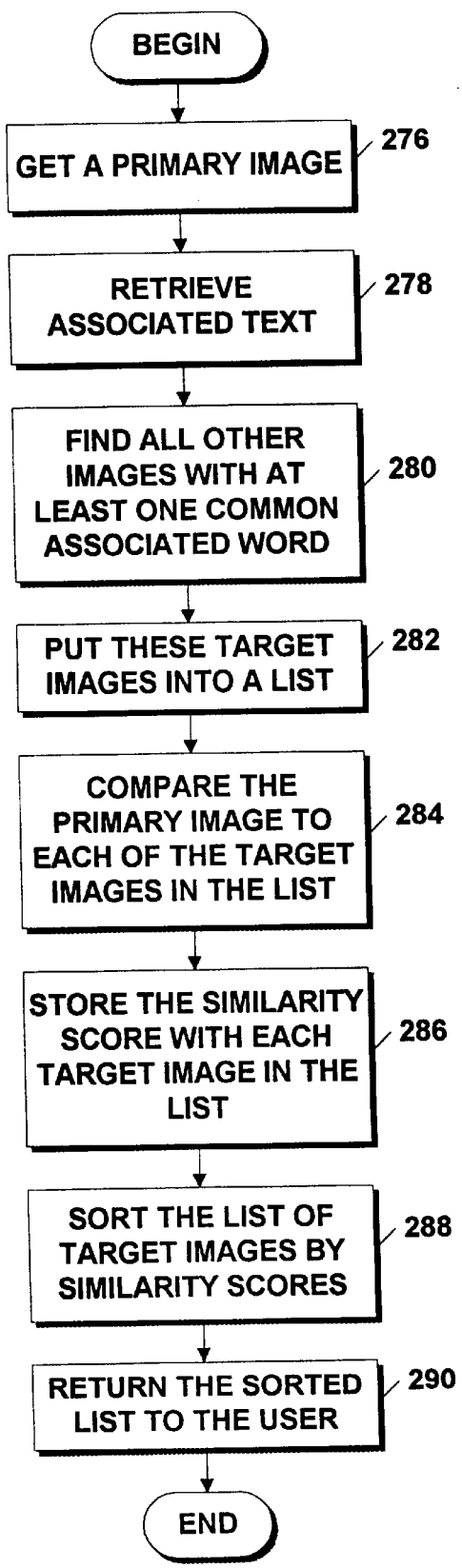
FIG. 12 is a flow diagram showing the steps to perform sorting by text and then by visual similarity.

Referring now to FIG. 12, the steps for first sorting images by text and then by visual similarity as shown. Processing begins in block 276 in which a primary image is retrieved. In block 278, the text associated with the image is also retrieved. This text may be retrieved from stored information or by data input by a user. In block 280 all other images with at least one common associated word are retrieved. In block 282, these images are grouped into a list of target images. This completes the retrieval by text step. The next step is to sort the list of target images by their visual similarity to the query or primary image. In block 284, a primary image is compared to each of the target images in the list. The comparison is made using the techniques described above in conjunction with FIGS. 3–3D.

In block 286, the similarity score with each target image in the list is stored. In block 288, the list of target images is sorted by similarity score and in block 290, an output of the sorted list is provided to a user.

Figure 12A:
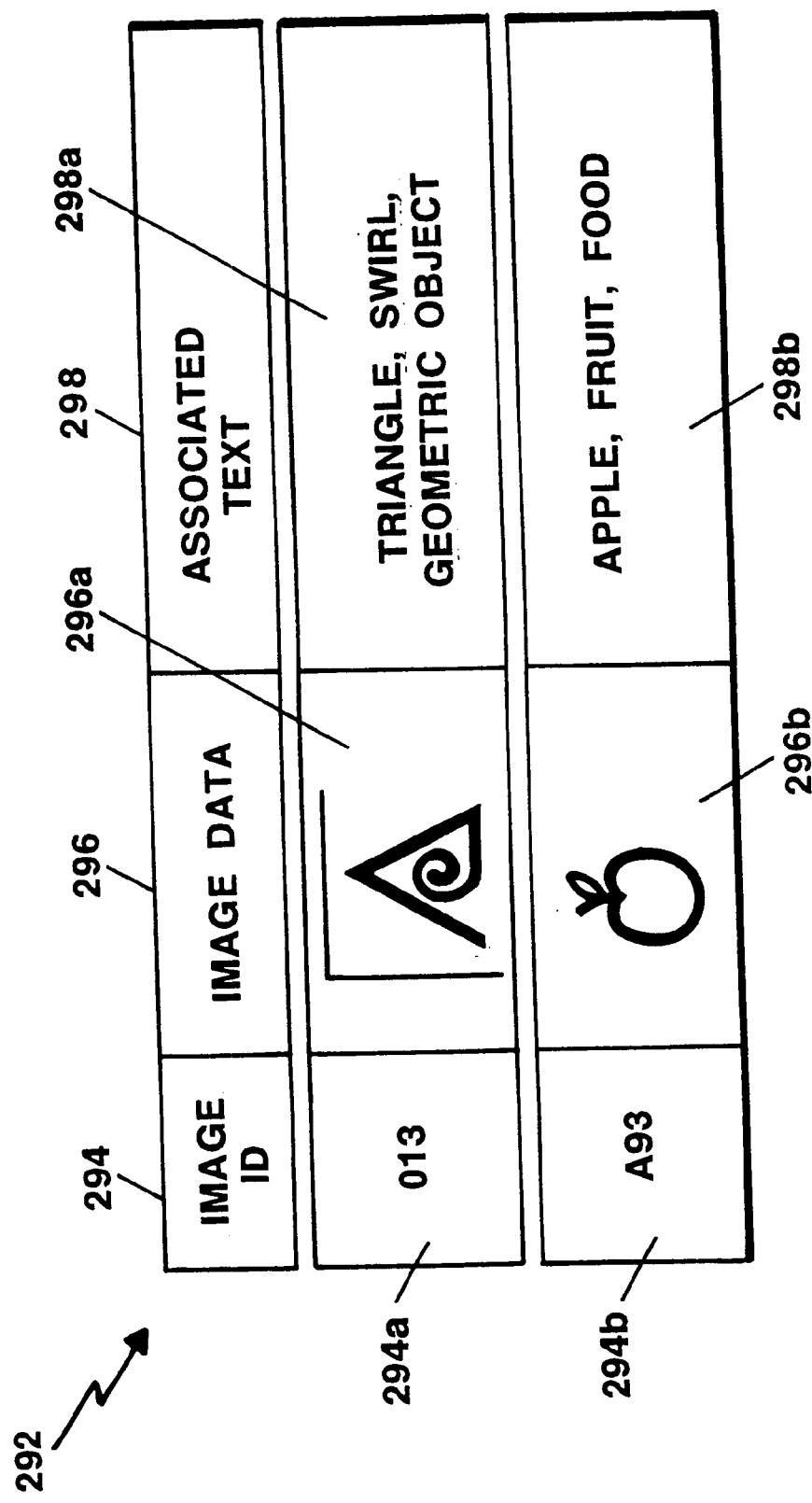
FIGS. 12A–12D are a series of views illustrating textual annotations used to locate images and then sorting the located images by visual similarity.

Referring now to FIG. 12A an exemplary data format 292 is shown. In this particular example, data string 292 includes an image identification field 294, an image data field 296 and associated text fields 298. The image identifier field 294 may be provided for example as an alphanumeric or a numeric identifier which indicates the position of the image on the storage device on which the image is stored. For example, the image data may be stored on a magnetic tape, a magnetic disk, a read only memory, a CD ROM or any other storage device well known to those of ordinary skill in the art. The image ID may or may not be related to the order in which the image is stored on the disk and in some embodiments the image ID field may be omitted. Image data field 296 corresponds to the values (e.g., digital values) which when properly interpreted result in the display of an image. The value is made to depict a color image or a gray skill image or any other type of image representation known to those of ordinary skill in the art.

Associated with each image data field 296 is a text field 298. The text field 298 includes a textural description of the image provided by the image data 296. Thus in this particular example, image 296a is described by text 298a as being a triangle swirl or geometric object. The particular text associated with each image is typically subjective and descriptive of the particular image. Image 296b is an image of an apple and thus the text 298b associated with image 296b is apple, fruit and food. Other associated text may also be associated with the apple such as the color red for example. In addition, he text information may not consist of a meaningful word. Often codes are used to describe images, such as the numeric coding scheme used by the Patent and Trademark office to describe trademark images. An example of such a code is the text string 01.01.03 which is known to be associated with a five pointed star.

In example in FIG. 12A, the data format 292 illustrates the fields 294, 296 and 298 in a contiguous manner. In some applications, however, the information may not be stored contiguously but rather may be associated by links from one field to the next. Thus any storage device the image data may be stored in one portion of the memory and the text field associated with that image data may be stored in a different portion of the memory.

Figure 12C:
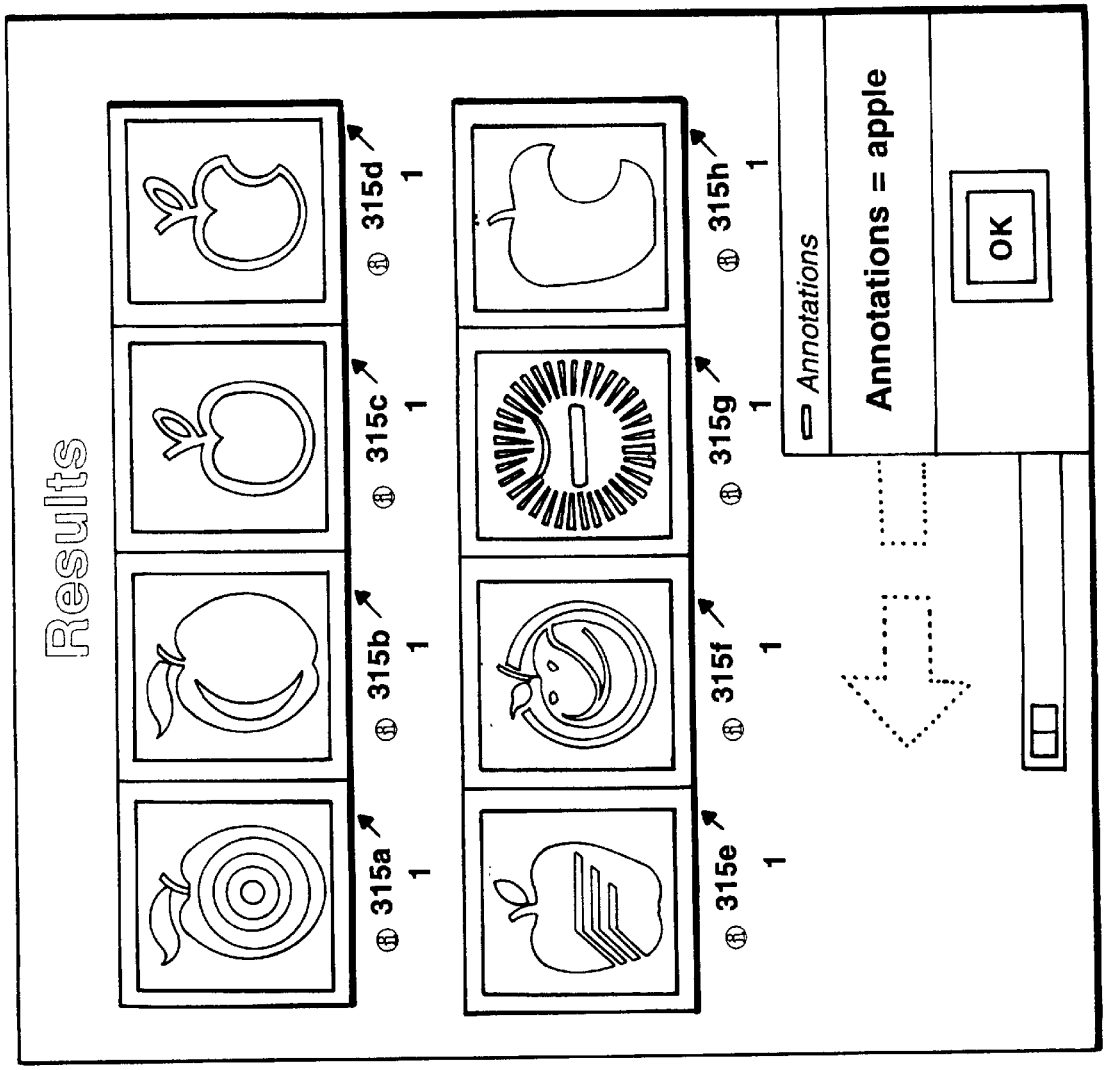
Figure 12B:
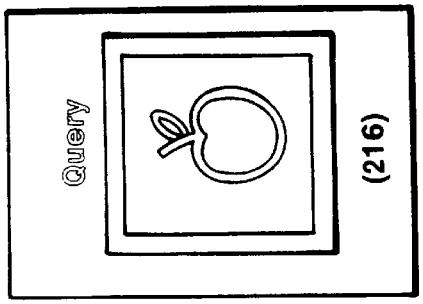
Figure 12D:
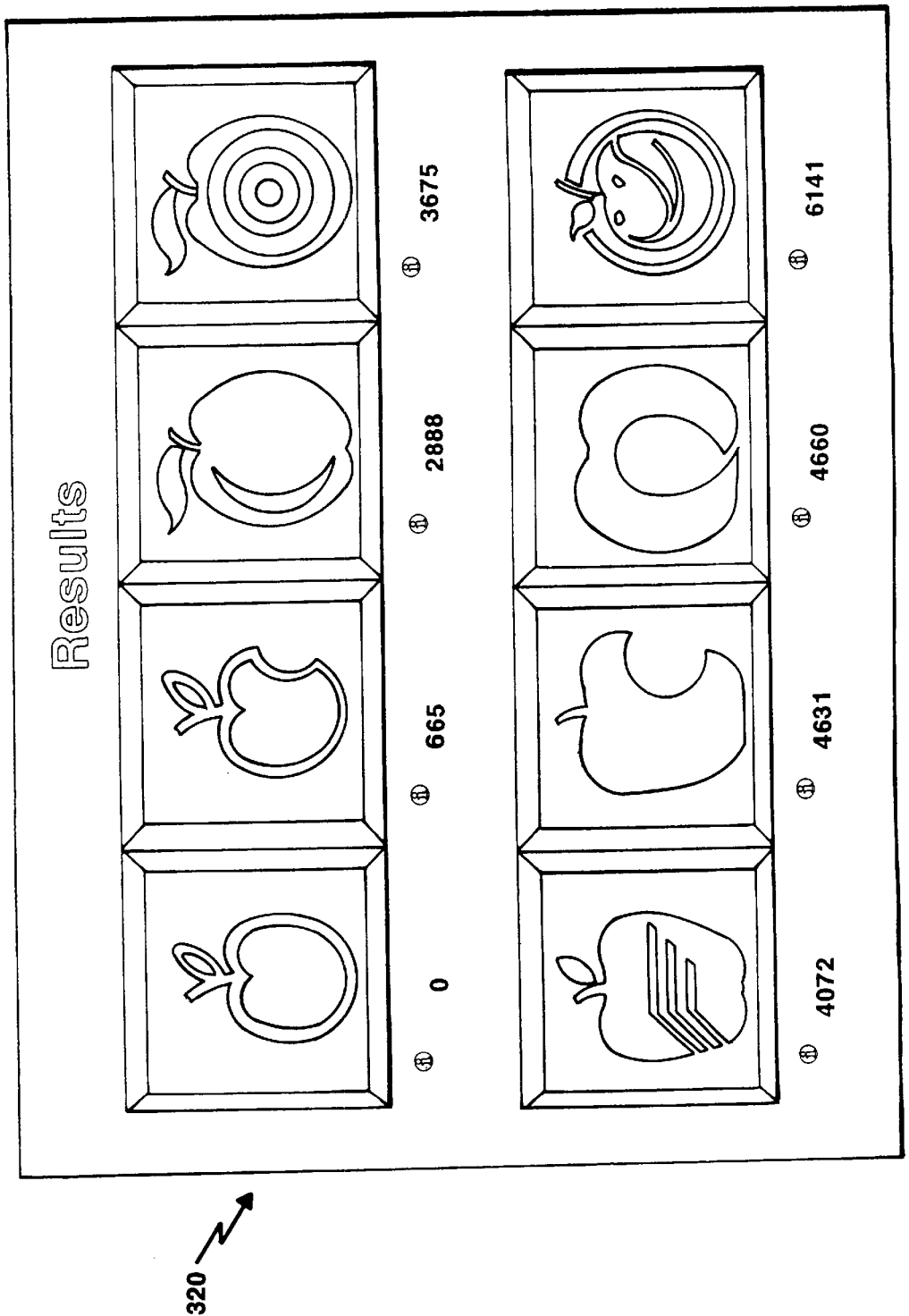

FIG. 12B shows the query image (an apple) while FIG. 12C shows the first eight images in the database which had been annotated with the word "apple". The results are shown in order of how they appear in the database (which has no bearing on how visually similar they are to the query image). FIG. 12D shows the set of images with the annotation "apple" sorted by visual similarity to the query image (FIG. 12C). The best eight images are shown in FIG. 12D. It should be notice in FIG. 12C that images 315c and 315d, which are very similar to the query image 310, are in the third and fourth positions. After sorting by visual similarity they appear in the first and second positions in FIG. 12D. The reordering of 315a and 315b after visual similarity matching should also be noticed. These are less visually similar to the query image. Image 315a is moved to the fourth position and image 315b is moved to the third position as shown in 12D. Image 315g which is not at all visually similar to the query image is displaced entirely from the top eight images. This image does not appear in FIG. 12D.

The use of text based search with visual similarity matching has several good attributes. The text based search ensures that the target images that are returned are in some way related to the query image. Unfortunately, the resulting set of images may be extremely long and unsorted. Without visual similarity matching, a user would have to look at each image to find the best match. Visual similarity matching sorts the resulting set of images in terms of visual closeness to the query image. Thus, the most visual similar target images are given priority in the list over less similar images. This last steps brings the most salient images to the attention of the user first. The user may use the similarity scores to determine when to stop looking at the list of images. If the scores get too high or there is a large jump in scores, this information may signal to the user that images after that point may not have much visual similarity with the query image.

FIGS. 12–12D describe the use of text and visual similarity matching as a two stage process to compare a query image to a set of target images. The two searches, however, may be integrated. Target images may be given a score which is a combination of a text match and a visual similarity score.

Referring now to FIG. 13, a circuit component 330, having a lead 332 coupled to a circuit line 334 via a solder joint 336 is shown. Such a circuit component is placed on a printed circuit board and coupled to the circuit line which is typically fabricated at part of the printed circuit board via an etching or deposition technique.

The particular manner in which the circuit component 330, circuit line 334, and lead 332, as well as the soldering technique used to couple the lead to the circuit line, may have an impact on the specific processing which takes place during an inspection process. However, during the inspection of the circuit component, different features or characteristics may become more or less important depending upon the manner and/or technique used to mount the circuit component, couple the circuit component to the circuit line, and fabricate the circuit line.

In this particular example, inspection of the gull wing lead 332 and solder joint 336 is described. In this particular example, it is recognized that the relative brightness between predetermined regions at and proximate to the solder joint 336, can be used to verify the joint as an acceptable or an unacceptable solder joint. Specifically, a top surface of circuit component 330 reflects a certain amount of light. The angled portion 332a of lead 332 reflects less light and thus appears darker than region 330a. Similarly, flat lead portion 332b appears brighter than lead portion 332a and a first portion of solder joint 336a appears darker than lead portion 332b. Solder portion 336b appears brighter than region 336a and solder region 336c appears darker than region 336b due to the angle at which the solder contacts the circuit line. Circuit line portion 334a corresponds to a flat portion of the circuit line 334 and thus reflects light at a different angle than solder region 336c and thus appears brighter than solder region 336b. Thus, when inspecting the solder joint 336, the relative luminance of each of the regions can be used in the inspection process and it is these relative luminance characteristics which can be specified in a plug-in module to thus expedite the image matching process.

Figure 14:
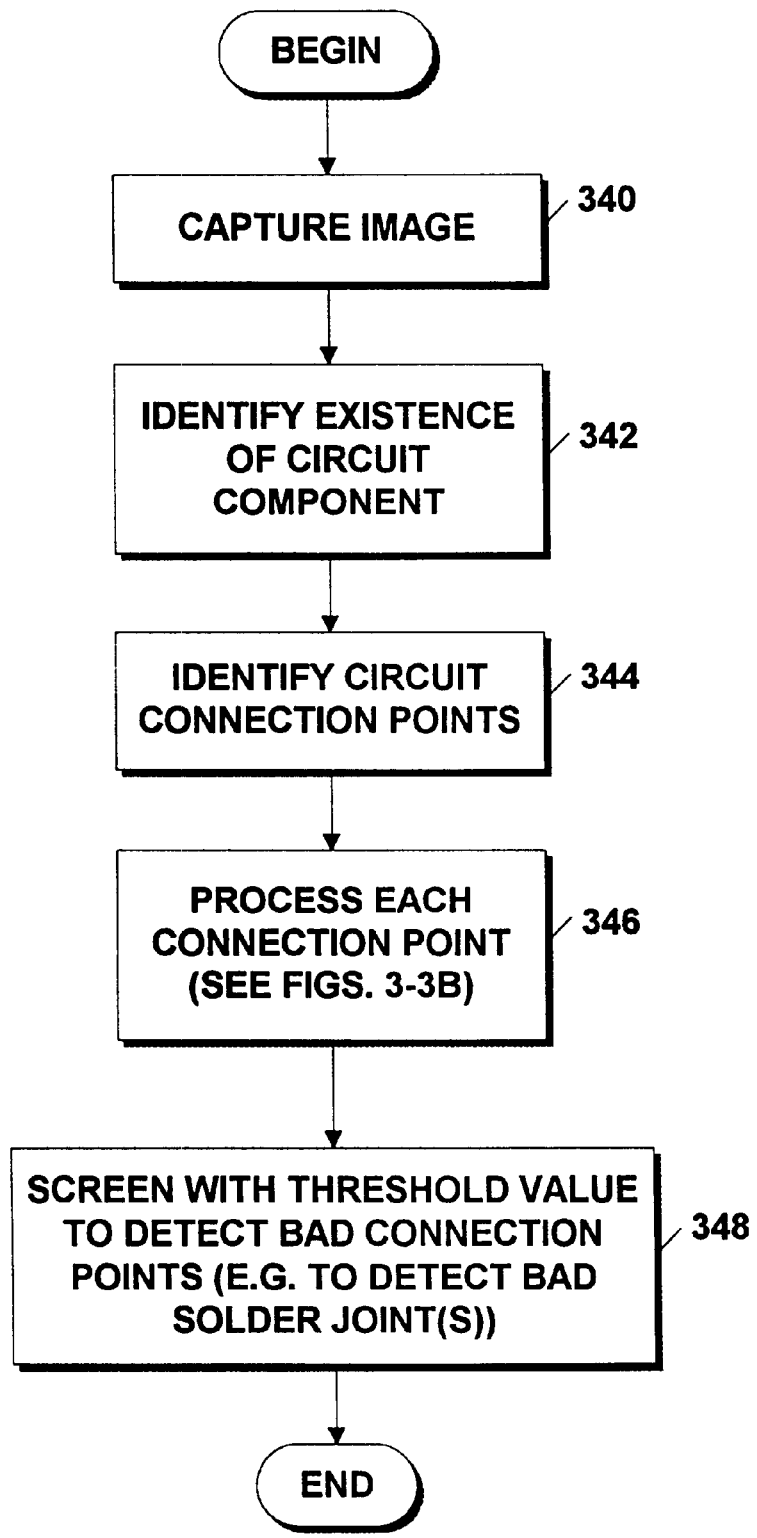
FIG. 14 is a flow diagram showing the steps to perform image processing in a circuit inspection system.

Referring now to FIG. 14, the steps to process an image in a circuit component inspection system are shown. Processing begins in step 340 where an image is captured. Referring briefly to FIGS. 13 and 13A, the image can be a portion of an entire printed circuit board containing a component and the leads from the component as illustrated in FIG. 13A (note in FIG. 13A only one lead is shown). The image would thus include a top view of circuit component 330, a top view of the lead 332, a top view of the solder joint 336, and a top view of the circuit line 334. Processing then proceeds to step 342 where the existence of the soldered component is verified. This can be accomplished by simply matching the circuit component region of the image portion of FIG. 13*a* to a stored image of a circuit component. Next, as shown in step 344, the circuit connection points (i.e., the circuit leads 332) are identified. The leads can be identified by matching a circuit component image to the captured image and knowing a priori where the leads are with respect the circuit component.

Processing then proceeds to step 346 where each lead and solder joint is seen as a primary image. The target image may be another stored image (or images) of a good lead and solder joint or a synthetic or composite image of the lead and joint. The target lead/joint is processed in accordance with the steps explained above in conjunction with FIGS. 3–3B using the lead plug-in-module (as referred to in the discussion of FIG. 13). The output value (i.e., the score) from the processing of step 346 is compared with a threshold value. If the score from processing 346 is greater than a predetermined threshold value, then the lead/solder joint is classified as a bad connection. (We are assuming that a low score corresponds to a good match, where a score of 0 is a perfect match). Processing then ends.

It should be noted that the threshold may have to be adjusted for different types of leads. Leads may vary in many aspects such as shape, size, and pitch. The threshold value may also change depending on the goals of the manufacturer. The manufacturer when setting up a production line may want to find all the bad leads at the expense of some false positives. In this case threshold in 348 should biased towards the low side. The manufacturer can analyze where and why the bad leads occur and change the production process to compensate for these errors. (This will be explained more fully in the text in conjunction with FIG. 14). Alternatively, when the production process is in full swing, the manufacturer may want to bias the threshold towards the high side to accept all good leads at the expense of missing a few bad leads.

It should be noted that in step 346, the target images could be pictures (real or composite) of bad leads. It would be ideal if this set of target images spanned the whole class of lead and joint defects. It would also be desirable, if each of the target images had information regarding what defect it portrays. In this case, a new lead such as image portions 332–334 in FIG. 13A are compared against the target images. If similarity is high (a low score) between the primary image and any target image, then the primary image should be classified as defective. The system should record not only the best similarity score, but also the target image that produced that score. This information will tell the system not only that the lead and joint are bad, but also why they bad.

It is very common for one component to have multiple leads on multiple sides. It should be noted images of one (or more) of the leads from the component may act as the primary image(s). Images of the rest of the leads from that component may act as the target images. For instance, in step 346, image 337 can be treated as the primary image as discussed above in conjunction with FIGS. 3–3B. The assumption here is that a component should have leads and joints that look very similar to each other. One or more good looking leads and joints should act as the primary images. Leads and joints from that component that have defects will look very visually different from the primary image. If the primary image has a defect, it should look different than the other leads from the component. Leads from one component may be compared also across different boards.

The target image does not have to contain both the lead and the joint. Just the solder joint as shown in 339 of FIG. 13A could be processed. Thus, the score value would represent the closeness of the match between image 339 and the target image which is the image of a good solder joint. Thus, a perfect match would indicate that image region 339 is also an image of a good solder joint. If the match between the target image and the primary image 339 is not good, this indicates that the target image is not an image of a good solder joint. Note also that views other than the top view of a circuit component could be used as both primary and target images.

Figure 15:
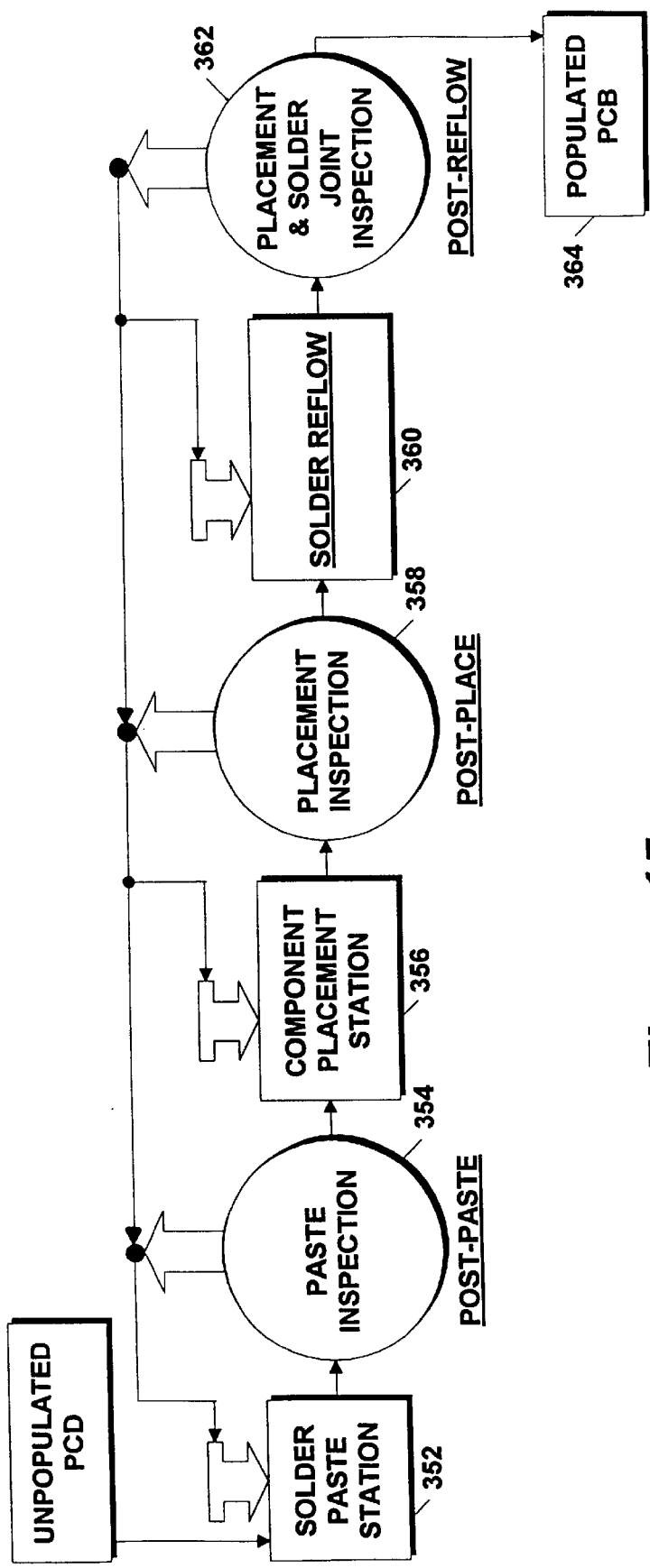
FIG. 15 is a diagram showing the steps to manufacture a printed circuit board.

Referring now to FIG. 15, in block 350 an unpopulated printed circuit board having electrical circuit lines etched, deposited or otherwise provided thereon is provided to a solder paste station as shown in block 352. The solder paste application station may be provided for example as a screen printer or any other device well known to those of ordinary skill in the art to apply solder paste to a printed circuit board. In some embodiments, the solder paste may be applied by hand. Regardless of the particular manner or technique used to apply solder paste to the printed circuit board, the solder paste is applied to predetermined regions of the printed circuit board. The solder paste should be applied in a predetermined amount within a given range. Processing then flows to block 54 in which a solder paste inspection system inspects the solder paste applied at the predetermined regions of the printed circuit board. The solder paste inspection system captures one or more images of the regions of the printed circuit board at which solder paste has been applied and at which inspection is necessary. The image captured by the paste inspection system may for example be an image of the entire printed circuit board in which case selected image regions of the printed circuit board image can be identified and compared to target images. The target images correspond to images of similar printed circuit board regions in which the solder paste has been properly applied. By comparing the captured image region to the target region and performing the imaging processing techniques described herein above in conjunction with FIGS. 3–14, a determination can be made as to whether the solder paste applied in block 352 was properly applied in each of the appropriate regions of the printed circuit board. If decision is made that the solder paste was not properly applied in one or more of the examined regions, then the printed circuit board is returned to block 352 where the solder paste is reapplied in each of the regions in which it had not been properly applied in the first instance. Thus, blocks 352 and 354 are repeated until the paste inspection system determines that the solder paste has been properly applied in each appropriate region.

Processing then flows to block 356 in which the printed circuit board with the solder paste properly applied thereon is provided to a component placement station. The component placement station can include a so called pick and place machine or alternatively, the placement station may involve manual placement of circuit components on the printed circuit board. The decision to use automated or manual component placement techniques is made in accordance with a variety of factors including but not limited to the complexity of the circuit component, the sensitivity of the circuit component to manual or machine handling, technical limitations of automated systems to handle circuit components of particular sizes and shapes and the cost effectiveness of using automated versus manual systems.

Once the circuit component is placed on the printed circuit board, processing moves through block 358 in which a placement inspection station performs an inspection of the placed circuit component. The placement inspection system includes an image capturing device to capturing image of each of the circuit components of interest. The captured image of the circuit component is compared to a target image of a placed circuit component using the techniques described here and above in conjunction with FIGS. 3–14. In response to the instructions from placement inspection station at block 358, processing can return to processing block 352 or processing block 356 depending upon the results of the placement inspection station in block 358.

Once determination is made in block 358 that the circuit component is properly placed and no other defects are detected, processing flows to block 360 in which a solder reflow station reflows the solder thus coupling the circuit component to the printed circuit board. Solder reflow station may be provided as an automated station or as a manual station. After solder reflow in block 360, processing flows to block 362 where a placement and solder joint inspection station inspects each circuit component and solder joint of interest. If not defects are detected, then processing flows to block 364 where a populated printed circuit board is provided.

It should be noted that in the above description, the target images are all of good examples of paste application, component placement, or relflowed solder joints. It is possible have a mixed population of both good and bad examples in the target images. The results of matching the input image to the good and bad examples will tell the system whether the image looks more similar to the good examples rather than the bad examples (or vice versa). This discrimination can be very important in the decision of whether to pass or fail the image. Similarity of the primary image to a specific bad example can provide information regarding the type of defect. This information is extremely desirable for purposes of tuning the production process.

Good and bad examples can be collected over time as multiple boards are sent through stages 350 to 362 in FIG. 15. These examples can be used to create or augment the target images for each of the three stages.

Each inspection stage (stages 354, 358 and 362) can collect data regarding the number and type of defects found. This data can be analyzed and fed back into the system to tune the process. For instance at stage 354, the post-paste inspection stage may consistently report insufficient paste over the whole board. This may mean that not enough paste is being applied in step 352. The inspection system may consistently report insufficient paste in one area on the board, suggesting a clogged opening in the paste stencil. A similar analysis may be done for post-placement and post-reflow defects. Feedback regarding errors may be sent from any inspection station to any part of the process prior to that inspection stage. For instance, consistent detection of insufficient solder in step 362 (post reflow) may mean that not enough paste is being applied in step 352 (pre reflow).

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. An image processing system comprising:
   (a) a search engine;
   (b) an image analyzer coupled to receive images from said search engine and to compare a first image in a first field of use to a second image in the first field of use provided thereto from said search engine; and
   (c) one or more feature modules, each of said one or more feature modules coupled to at least one of said search engine and said image analyzer with each individual one of said one or more feature modules specifying information relevant to a particular field of use and wherein a particular one of the one or more feature modules provides to said image analyzer, application specific information which is used by said image analyzer to compare the first and second images, wherein the information corresponds to at least one of an image parameter, an image characteristic and a constraint in the first field of use.

2. The system of claim 1 further comprising an input system coupled to one of said search engine and said image analyzer, said input system comprising at least one of: a graphical user interface; a facsimile system; a camera system; a scanner; a network connection; and a video system.

3. The system of claim 2 wherein each of said one or more feature modules defines at least one measurement to make on one or more pixels in an image region neighboring the one particular image region.

4. The system of claim 1 wherein each of said one or more feature modules defines at least one particular region of an image and at least one particular measurement to make on one or more pixels within each of the at least one particular image regions.

5. The system of claim 3 further comprising a storage device having at least one image stored therein coupled to one of said a search engine, said image analyzer and said feature module.

6. A process for comparing two images comprising the steps of:
   (a) providing a compact primary image by providing application specific information to collapse at least one primary image subregion;
   (b) aligning a target image having a first predetermined characteristic and the compact primary image having the first predetermined characteristic;
   (c) dividing the compact primary image into a plurality of image regions each of the image regions of the primary image having a set of image region characteristics;
   (d) selecting a primary image region of the compact primary image;
   (e) dividing the target image into a plurality of target image regions;
   (f) selecting one of the plurality of target image regions; and
   (g) comparing one or more image region characteristics of the selected one of the primary image region of the compact primary image to corresponding image region characteristics in the selected one of the plurality of target image regions.

7. The process of claim 6, further comprising the steps of:
   (g) assigning a score indicating the difference between the set of image characteristics in the primary image region of the compact primary image and the corresponding set of image characteristics in the selected one of the plurality of target image regions;

(h) selecting a next one of the plurality of image regions in the target image;

(i) comparing one or more image region characteristics of the selected next one of the primary image region of the compact primary image to corresponding image region characteristics in the selected next one of the plurality of target image regions; and (j) assigning a score indicating the difference between the image region characteristics in the primary image region of the compact image and the corresponding image region characteristics in the next target image region.

8. The process of claim 7 further comprising the step of repeating steps (h)–(j) for each of a predetermined number of regions in the target image.

9. The process of claim 8 further comprising the step of finding the best match between the primary image region of the compact image and one of the predetermined regions in the target image.

10. The process of claim 9, further comprising the steps of:

selecting a next primary image region in the compact primary image; and repeating steps (h)–(j) for each desired primary image region.

11. The process of claim 10, further comprising the steps of:

computing a total match score; and providing said total match score as output.

12. The process of claim 6, further comprising the step of:

combining the set of image region characteristics in first ones of the plurality of image regions with the set of image region characteristics in second ones of the plurality of image regions of the selected image to provide a plurality of combined image regions which represent a compact primary image wherein each of the combined image regions are provided having a set of image region characteristics which are a combination of the image region characteristics of at least a first and a second image region of the primary image.

13. A method of manufacturing a printed circuit board comprising the steps of:

(a) performing a manufacturing operation on a printed circuit board;

(b) obtaining an electronic image of the manufacturing operation wherein the image includes at least a portion of the printed circuit board and wherein the image corresponds to a primary image having a first application specific predetermined characteristic;

(c) aligning the primary image to a target image of the manufacturing operation wherein the target image includes at least the portion of the printed circuit board included in the primary image and wherein the target image has the first predetermined characteristic;

(d) dividing the primary image into a plurality of primary image regions each having a set of application specific primary image region characteristics;

(e) combining the set of primary image region characteristics in first ones of the plurality of primary image regions with the set of image region characteristics in second ones of the plurality of primary image regions to provide a plurality of combined image regions which represent the primary image wherein each of the combined image regions are provided having a set of image region characteristics which are a combination of the image region characteristics of at least first and second primary image regions;

(f) selecting one of the plurality of combined image regions;

(g) dividing the target image into a plurality of target image regions;

(h) selecting one of the plurality of target image regions; and (i) inspecting the result of the manufacturing operation by comparing one or more image region characteristics of the selected one of the plurality of combined image regions to corresponding image region characteristics in the selected one of the plurality of target image regions.

14. The method of claim 13 further comprising the steps of:

capturing an image of a portion of the printed circuit board wherein said captured image portion includes an image of the printed circuit board having the manufacturing operation applied thereto;

selecting a region of the captured image;

aligning a target image and the selected region of the captured wherein the target image corresponds to an image of a printed circuit board which has been properly manufactured in during that particular portion of the manufacturing process and wherein each of the target and selected images has at least one property;

dividing the selected image into a plurality of image regions each of the images regions having at least one property;

combining properties in predetermined ones of the plurality of image regions;

selecting a primary image region within the selected image;

selecting a target image region;

comparing one or more properties of the primary image region within the selected image to a corresponding one or more properties in the target image region; and in response to the primary image being substantially similar to the target image in said comparing step, utilizing, as the target images, images of like portions of the printed circuit board having the same manufacturing operation applied thereto as the primary image.

15. The process of claim 11, wherein the step combining the set of primary image region characteristics in first ones of the plurality of primary image regions with the set of image region characteristics in second ones of the plurality of primary image regions to provide a plurality of combined image regions which compactly represent the primary image as a compact primary image further comprises the step of combining primary image region characteristics in neighboring primary image regions to provide combined image regions.

16. The process of claim 13 wherein for each of a predetermined number of regions in the target image the method further comprises the step of repeating the steps of:

(1) selecting a next region in the target image;

(2) comparing one or more image region characteristics of the compact image region to a corresponding one or more image region characteristics in the next target image region; and (3) assigning a score indicating the difference between the one or more image region characteristics in the compact image region and the corresponding one or more image region characteristics in the next target image region.

17. The process of claim 16 further comprising the step of finding the best match between the compact image region and one of the predetermined regions in the target image.

18. The process of claim 13, wherein the target image corresponds to an image of a printed circuit board portion which has failed a printed circuit board inspection process.

19. The process of claim 13 wherein the manufacturing operation corresponds to a solder paste application step.

20. The process of claim 13 wherein said manufacturing operation corresponds to a component placement operation.

21. The process of claim 13 wherein said manufacturing operation corresponds to a solder reflow operation.

22. The process of claim 18 wherein said manufacturing operation corresponds to a solder operation and the method further includes the step of utilizing relative brightness between predetermined regions at and proximate to a solder joint to verify the acceptability of the solder joint.

23. A memory for storing a model for access by an image processing system, the model comprising:

a plurality of image regions each of the image regions from a primary image having a set of application specific image region characteristics; and a set of image region characteristics wherein the set of region characteristics are provided from a combination of the set of image region characteristics in first ones of the plurality of image regions with second ones of the plurality of image regions to provide a plurality of combined image regions which represent a compact primary image wherein each of the combined image regions are provided having a set of image region characteristics which are a combination of the image region characteristics of at least a first and a second image region of the primary image.

24. The memory of claim 23 further wherein at least one of the combined image regions includes a combined spatial and a combined photometric relationship between a first one of the plurality of image patches and a second one of the plurality of image patches within the model.

25. The memory of claim 24 wherein the least one of the combined image regions includes the characteristics of a third one of the plurality of image regions.

26. The memory of claim 24 wherein each of the plurality of image regions correspond to a subset of an entire image.

* * * * *

UNITED STATES PATENT AND TRADEMARK OFFICE
CERTIFICATE OF CORRECTION

PATENT NO. : 6,463,426 B1
DATED : October 8, 2002
INVENTOR(S) : Lipson et al.

It is certified that error appears in the above-identified patent and that said Letters Patent is hereby corrected as shown below:

Column 2,
Line 9, delete "video frames based" and replace with -- video frame based --.
Line 39, delete "target iomage" and replace with -- target image --.
Line 54, delete "to searching for" and replace with -- to search for --.

Column 3,
Line 21, delete "image is provided" and replace with -- images is provided --.
Line 23, delete "time require" and replace with -- time required --.
Line 24, delete "in a selected regions" and replace with -- in a selected region --.
Line 36, delete "increases" and replace with -- increased --.
Line 59, delete "captured corresponds" and replace with -- captured images corresponds --.
Line 65, delete "solder-paste" and replace with -- solder paste --.

Column 4,
Line 14, delete "image;" and replace with -- images --.
Line 18, delete "operations;" and replace with -- operation --.
Line 21, delete "view the" and replace with -- view of the --.
Line 66, delete "associate with" and replace with -- associated with --.

Column 5,
Line 10, delete "roller-coaster" and replace with -- roller coaster --.
Line 37, delete "grey" and replace with -- gray --.
Line 62, delete "Luminosity" and replace with -- luminosity --.

Column 7,
Line 63, delete "image, 20," and replace with -- image 20, --.
Line 67, delete "image, 20," and replace with -- image 20, --.

Column 8,
Line 65, delete "query hand" and replace with -- query and --.

Column 12,
Line 4, delete "weighed less" and replace with -- weighted less --.
Line 46, delete "where next" and replace with -- where the next --.
Line 56, delete "when decision" and replace with -- when the decision --.
Line 62, delete "the best score" and replace with -- the best scores --.
Line 63, delete "with each primary" and replace with -- with each of the primary --.

UNITED STATES PATENT AND TRADEMARK OFFICE
CERTIFICATE OF CORRECTION

PATENT NO. : 6,463,426 B1
DATED : October 8, 2002
INVENTOR(S) : Lipson et al.

It is certified that error appears in the above-identified patent and that said Letters Patent is hereby corrected as shown below:

Column 13,
Line 8, delete "attributes," and replace with -- attributes: --.
Line 9, delete "$c_1$-$c_{8 \text{ and } q_1}$-$q_8$" and replace with -- $c_1$-$c_8$ and $q_1$-$q_8$ --.
Line 16, delete "and with" and replace with -- with --.
Line 20, delete "is query" and replace with -- $i^{th}$ query --.
Line 32, delete " 2323b" and replace with -- 23b-23d --.
Line 35, delete "Please check sentence."

Column 14,
Line 1, delete "Those Ordinary" and replace with -- Those of ordinary --.
Line 57, delete "defied" and replace with -- defined --.

Column 15,
Line 20, delete "compares" and replace with -- comparisons --.

Column 16,
Line 26, delete "instance, his" and replace with -- instance, this --.
Line 53, delete "includes weighting" and replace with -- includes a weighting --.
Line 57, delete "result" and replace with -- results --.
Line 60, delete "images regions" and replace with -- image regions --.

Column 19,
Line 16, delete "display the" and replace with -- display and the --.

Column 20,
Line 47, delete "manner is" and replace with -- manner in --.

Column 21,
Line 16, delete "where decision" and replace with -- where a decision --.
Line 18, delete "If decision" and replace with -- If the decision --.
Line 29, delete "decision" and replace with -- a decision --.
Line 51, delete "202 decision" and replace with -- 202 a decision --.

Column 22,
Line 21, delete "point in in" and replace with -- point in --.
Line 40, delete "Processing then flow" and replace with -- Processing then flows --.
Line 45, delete "move" and replace with -- moves --.
Line 47, delete "218 decision" and replace with -- 218 a decision --.
Line 61, delete "and record" and replace with -- and a record --.

UNITED STATES PATENT AND TRADEMARK OFFICE
CERTIFICATE OF CORRECTION

PATENT NO.     : 6,463,426 B1
DATED          : October 8, 2002
INVENTOR(S)    : Lipson et al.

It is certified that error appears in the above-identified patent and that said Letters Patent is hereby corrected as shown below:

Column 23,
Line 1, delete "where decision" and replace with -- where a decision --.
Line 3, delete "If decision" and replace with -- If the decision --.
Line 11, delete "where decision" and replace with -- where a decision --.
Line 26, delete "id" and replace with -- ID --.
Line 31, delete "which decision" and replace with -- which a decision --.
Line 36, delete "When decision" and replace with -- When the decision --.
Line 47, delete "id" and replace with -- ID --.
Line 52, delete "266,decision" and replace with -- 266, a decision --.
Line 53, delete "If decision" and replace with -- If the decision --.

Column 24,
Line 41, delete "way incorporate" and replace with -- way to incorporate --.
Line 48, delete "query images" and replace with -- query image --.
Line 53, delete "as shown" and replace with -- is shown --.

Column 25,
Line 31, delete "he text" and replace with -- the text --.
Line 37, delete "In example" and replace with -- In the example --.
Line 41, delete "Thus any" and replace with -- Thus in any --.
Line 54, delete, "be notice" and replace with -- be noticed --.

Column 27,
Line 34, delete "case threshold" and replace with -- case the threshold --.
Line 35, delete "biased" and replace with -- be biased --.
Line 56, delete "they bad" and replace with -- they are bad --.

Column 28,
Line 47, delete "If decision" and replace with -- If a decision --.

Column 29,
Line 24, delete "If not" and replace with -- If no --.
Line 28, delete "all of good" and replace with -- all good --.
Line 29, delete "possible have" and replace with -- possible to have --.
Line 57, delete "(post reflow)" and replace with -- (post-reflow) --.
Line 58, delete "(pre reflow)" and replace with -- (pre-reflow) --.

UNITED STATES PATENT AND TRADEMARK OFFICE
CERTIFICATE OF CORRECTION

PATENT NO. : 6,463,426 B1
DATED : October 8, 2002
INVENTOR(S) : Lipson et al.

It is certified that error appears in the above-identified patent and that said Letters Patent is hereby corrected as shown below:

Column 32,
Line 23, delete "captured wherein" and replace with -- captured image wherein --.
Line 25, delete "manufactured in during" and replace with -- manufactured during --.
Line 45, delete "of claim 11" and replace with -- of claim 13 --.

Signed and Sealed this

Thirteenth Day of May, 2003

JAMES E. ROGAN
*Director of the United States Patent and Trademark Office*